(12) United States Patent
Okuda

(10) Patent No.: US 8,515,437 B2
(45) Date of Patent: Aug. 20, 2013

(54) WIRELESS RESOURCE ALLOCATION METHOD, WIRELESS MOBILE STATION AND WIRELESS BASE STATION IN WIRELESS COMMUNICATION SYSTEM

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 12/731,595

(22) Filed: Mar. 25, 2010

(65) Prior Publication Data
US 2010/0177730 A1 Jul. 15, 2010

Related U.S. Application Data

(63) Continuation of application No. PCT/JP2007/068946, filed on Sep. 28, 2007.

(51) Int. Cl.
*H04W 72/04* (2009.01)

(52) U.S. Cl.
USPC ............... 455/450; 455/452.1; 455/452.2; 370/329; 370/338; 370/328; 370/447

(58) Field of Classification Search
USPC ............. 455/450, 452.1, 452.2; 370/329, 370/328, 338, 447
See application file for complete search history.

(56) References Cited

U.S. PATENT DOCUMENTS

| | | | |
|---|---|---|---|
| 6,836,666 B2 * | 12/2004 | Gopalakrishnan et al. | 455/452.2 |
| 6,956,834 B2 * | 10/2005 | Stanwood et al. | 370/329 |
| 6,977,919 B1 | 12/2005 | Stanwood | |
| 6,978,144 B1 * | 12/2005 | Choksi | 455/452.2 |
| 7,031,720 B2 * | 4/2006 | Weerakoon et al. | 455/452.2 |
| 7,400,642 B2 | 7/2008 | Koo et al. | |
| 7,450,949 B2 * | 11/2008 | Choksi | 455/452.2 |
| 7,599,321 B2 * | 10/2009 | Lee et al. | 370/320 |
| 7,719,997 B2 * | 5/2010 | Weinman | 370/252 |
| 7,760,680 B2 * | 7/2010 | Chen et al. | 370/328 |
| 7,948,936 B2 * | 5/2011 | Lohr et al. | 370/329 |
| 8,009,645 B2 * | 8/2011 | Lee et al. | 370/338 |
| 8,098,622 B2 * | 1/2012 | Yeo et al. | 370/329 |

(Continued)

FOREIGN PATENT DOCUMENTS

| | | |
|---|---|---|
| EP | 1257140 A1 | 11/2002 |
| EP | 1643690 A1 | 4/2006 |

(Continued)

OTHER PUBLICATIONS

Korean Intellectual Property Office Notice of Preliminary Rejection dated May 13, 2011 for application No. 10-2010-7006445.

(Continued)

*Primary Examiner* — Meless N Zewdu
*Assistant Examiner* — Jean Chang
(74) *Attorney, Agent, or Firm* — Smith, Gambrell & Russell, LLP

(57) ABSTRACT

A wireless mobile station transmits a signal string representing a wireless resource allocation request and service quality information on transmission data to be transmitted to a wireless base station. The wireless base station identifies the service quality information based on the signal string received from the wireless mobile station, and controls allocation of an uplink wireless resource to the wireless mobile station based on the identified service quality information. This enables wireless resource allocation in consideration of service quality information on transmission data of the wireless mobile station.

17 Claims, 22 Drawing Sheets

(56) References Cited

U.S. PATENT DOCUMENTS

| | | | |
|---|---|---|---|
| 8,111,659 B2* | 2/2012 | Stanwood | 370/329 |
| 8,126,474 B2* | 2/2012 | Huomo et al. | 455/452.1 |
| 8,175,610 B2* | 5/2012 | Pi et al. | 455/452.1 |
| 2002/0052956 A1* | 5/2002 | Seibold et al. | 709/225 |
| 2003/0084144 A1* | 5/2003 | Lipinski | 709/224 |
| 2003/0103520 A1* | 6/2003 | Chen et al. | 370/444 |
| 2004/0023661 A1* | 2/2004 | Pi et al. | 455/450 |
| 2005/0047429 A1* | 3/2005 | Koo et al. | 370/447 |
| 2005/0063330 A1* | 3/2005 | Lee et al. | 370/328 |
| 2005/0250509 A1* | 11/2005 | Choksi | 455/452.1 |
| 2007/0086370 A1* | 4/2007 | Jang et al. | 370/318 |
| 2007/0121542 A1* | 5/2007 | Lohr et al. | 370/329 |
| 2007/0153746 A1 | 7/2007 | Lee et al. | |
| 2009/0116434 A1* | 5/2009 | Lohr et al. | 370/329 |
| 2009/0290509 A1* | 11/2009 | Vujcic et al. | 370/254 |
| 2009/0290570 A1* | 11/2009 | Kishiyama et al. | 370/344 |

FOREIGN PATENT DOCUMENTS

| | | |
|---|---|---|
| EP | 1816883 A1 | 8/2007 |
| EP | 2034631 A1 | 3/2009 |
| GB | 2381996 A | 5/2003 |
| JP | 2007504708 | 3/2007 |
| JP | 2007184936 | 7/2007 |
| KR | 1020070073626 | 7/2007 |
| WO | 2008113966 A1 | 9/2008 |

OTHER PUBLICATIONS

IEEE Std 802.16-2004 "IEEE Standard for Local and metropolitan area networks Part 16: Air Interface for Fixed Broadband Wireless Access Systems" IEEE Computer Society and the IEEE Microwave Theory and Techniques Society dated Oct. 1, 2004.

IEEE Std 802.16e-2005 "IEEE Standard for Local and metropolitan area networks Part 16: Air Interface for Fixed and Mobile Broadband Wireless Access Systems" IEEE Computer Society and the IEEE Microwave Theory and Techniques Society dated Feb. 28, 2006.

International Search Report dated Oct. 30, 2007, in corresponding International application No. PCT/JP2007/068946.

Chinese Notification of the Office Action dated Mar. 22, 2012 issued in application No. 200780100860.0.

Extended European Search Report dated May 22, 2013 issued for corresponding Application No. 07828688.7-1854/2194674.

* cited by examiner

WIRELESS RESOURCE ALLOCATION METHOD, WIRELESS MOBILE STATION AND WIRELESS BASE STATION IN WIRELESS COMMUNICATION SYSTEM

CROSS-REFERENCE TO RELATED APPLICATION

This application is a continuation Application of a PCT international application No. PCT/JP2007/068946 filed on Sep. 28, 2007 in Japan, the entire contents of which are incorporated by reference.

FIELD

The embodiment discussed herein relates to a wireless resource allocation method, a wireless mobile station and a wireless base station in a wireless communication system. The embodiment is suitable for use in a system in which a wireless base station allocates a wireless resource that a wireless mobile station uses to transmit data to the wireless base station, for example.

BACKGROUND

IEEE802.16 WG (Working Group) defines Point-to-Multipoint (P-MP) type communication system in which a plurality of terminals can be connected to a wireless base station. Mainly, IEEE802.16 WG defines two types, that is, IEEE802.16d specification (802.16-2004) mainly for fixed communication application and 802.16e specification (802.16e-2005) for mobile communication application. Where, plural physical layers are defined and techniques such as OFDM, OFDMA and the like are mainly used.

In a communication system in conformity with IEEE802.16d/e (hereinafter, generally named as IEEE802.16), P-MP type connection where a plurality of wireless mobile stations (MSs) are connected to one wireless base station (BS) is possible. Incidentally, wireless mobile station includes various terminals such as cellular phone, PDA, note PC, etc.

According to IEEE802.16, the BS allocates a wireless bandwidth to an MS when the MS transmits data. When the MS makes a request for allocation of a bandwidth used for data transmission to the BS, the MS should first transmit a code in a predetermined pattern called "Bandwidth Request CDMA Code" (hereinafter, referred as BR code).

BR code is a kind of CDMA codes, and part of CDMA codes, which are defined up to 256 in number, is used as BR code. Other CDMA codes are used for Initial Ranging performed when the MS starts a connection with the BS, Periodic Ranging after the connection is established, etc. Incidentally, these CDMA codes are generally called ranging codes, occasionally.

FIG. 21 illustrates a sequence from when the MS transmits a BR code to when a bandwidth for data transmission is actually allocated.

When the MS makes a request for a bandwidth of wireless resource (uplink:UL) to transmit data to the BS, the MS chooses at random one of CDMA codes defined as the BR codes, and transmits the chosen CDMA code to the BS (step S101).

The BS having received the BR code transmits an uplink map message (UL-MAP message) containing an information element called "CDMA_Allocation-IE" in order to allocate a wireless resource [band(width)] that the MS uses to transmit a message called "Bandwidth Request Header" (hereinafter, referred as BR header) (step S102).

In table 1, an example of payload of UL-MAP message containing CDMA_Allocation-IE.

TABLE 1

UL-MAP message containing CDMA_Allocation-IE

| Field Name | Field Length | Value |
|---|---|---|
| UL-MAP message | | |
| Management Message Type | 8b | 3 (representing UL-MAP message) |
| Reserved | 8b | |
| UCD count | 8b | |
| Allocation Start Time | 32b | |
| No. OFDMA Symbols | 8b | Number of Symbols for UL subframe |
| <UL-MAP_IE for OFDMA PHY> | | |
| UIUC | 4b | 14 (representing CDMA_Allocation-IE) |
| <CDMA_Allocation-IE> | 32b | |
| Duration | 6b | Number of Slots (representing an allocation amount of wireless resource) |
| UIUC | 4b | Representing modulation scheme and coding scheme/rate to be used |
| Repetition Coding Information | 2b | Representing repetition code |
| Ranging Code | 8b | Representing CDMA Code Index received by BS |
| Ranging Symbol | 8b | Representing at which symbol a code received by BS is placed |
| Ranging Subchannel | 7b | Representing in which subchannel a code received by BS is placed |
| Bandwidth Request Mandatory | 1b | Representing whether MS transmits BR Header in given wireless resource |

The MS having received the BR code can discriminate whether a wireless resource is allocated to its own station or not from Ranging Code, Ranging Symbol and Ranging Subchannel contained in CDMA_Allocation-IE.

The MS receives the UL-MAP message, and transmits a BR header in an allocated bandwidth to the BS when the bandwidth to transmit a BR header is allocated (step S103). The BR header contains identification information (CID) on a logical connection between the MS and the BS, setting of which is requested by the MS, and information on a size (the number of bytes) of data that the MS desires to transmit.

FIG. 22 illustrates an example of BR header format. Table 2 below illustrates meaning of each field of the BR header.

TABLE 2

Bandwidth Request Header Field

| Field Name | Description |
|---|---|
| HT: Header Type | 1 = Bandwidth request header |
| EC: Encryption Control | 0 = Payload is not encrypted |
| Type | Bandwidth Request Type 000: incremental 001: aggregate |
| BR: Bandwidth Request | The number of bytes of uplink bandwidth requested by the SS. The request shall not include any PHY overhead. |

TABLE 2-continued

Bandwidth Request Header Field

| Field Name | Description |
|---|---|
| CID: Connection Identifier | Requesting Connection ID. |
| HCS: Header Check Sequence | Used to detect header errors |

From CID contained in this BR header, the BS can specify an MS that has transmitted the BR header (this MS having completed network entry and association between the MS and CID being managed on the network's side), and can specify a connection for which the wireless resource (bandwidth) is requested and service quality (QoS: Quality of Service) information thereon. Incidentally, QoS information is exchanged between the BS and the MS at the time of connection setting.

The BS determines whether to allocate the requested bandwidth for data transmission, in consideration of the QoS information. In other words, when receiving requests (BR headers) from plural MSs, the BS gives preference to a connection where high QoS is requested, and allocates a bandwidth. Allocation of bandwidth is performed by transmitting an UL-MAP message by the BS (step S104).

Since the BS having received the BR header or the like can specify a CID to which allocation of wireless resource is necessary, the BS can allocate the wireless resource with the use of a message (UL-MAP message) in a format differing from one used at the time of allocation in response to reception of the BR code.

Table 3 below illustrates an example of UL-MAP message generated by the BS in response to reception of BR header or the like.

TABLE 3

UL-MAP message responsive to BR header

| Field Name | Field Length | Value |
|---|---|---|
| UL-MAP message | | |
| Management Message Type | 8b | 3 (representing UL-MAP message) |
| Reserved | 8b | |
| UCD count | 8b | |
| Allocation Start Time | 32b | |
| No. OFDMA Symbols | 8b | Number of Symbols for UL subframe |
| <UL-MAP_IE for OFDMA PHY> | | |
| CID | 16b | Representing MS to be allocated wireless resource |
| UIUC | 4b | Representing modulation scheme and coding scheme/rate to be used |
| Duration | 10b | Number of Slots (representing an allocation amount of wireless resource) |
| Repetition Coding Information | 2b | Representing repetition code |

The MS transmits data (MAC-PDU: Medium Access Control—Protocol Data Unit) with the use of a bandwidth allocated in the UL-MAP message (step S105).

In Patent Document 1 below, specific code and data amount to be transmitted from the MS to the BS are associated with each other.

Patent Document 1: Japanese Patent Application Laid-Open Publication No. 2007-184936
Non-Patent Document 1: IEEE Std 802.16™ 2004
Non-Patent Document 2: IEEE Std 802.16e™ 2005

SUMMARY

"A wireless resource allocation method, and a wireless mobile station and a wireless base station in wireless communication system" below will be disclosed in this description.

(1) More specifically, in an allocation method in a first mode, which is not limitative, a wireless mobile station transmits a signal string, which represents a wireless resource allocation request and service quality information on transmission data to be transmitted to the wireless base station, to a wireless base station, and the wireless base station identifies the service quality information based on the signal string received from the wireless mobile station, and controls allocation of uplink wireless resource to the wireless mobile station based on the identified service quality information.

(2) Wherein, the wireless base station may allocate an uplink wireless resource that the mobile station can use to make a request to the wireless base station for an uplink wireless resource amount according to a transmission data amount of the transmission data to the wireless mobile station in order of preference determined according to the identified service quality information.

(3) The wireless mobile station may transmit the signal string further representing a transmission data amount of the transmission data to the wireless base station, and the wireless base station may further identify the transmission data amount based on the signal string received from the wireless mobile station, and control the allocation of an uplink wireless resource according to the transmission data amount based on the identified service quality information and the identified transmission data amount.

(4) Further, the wireless base station may allocate an uplink wireless resource according to the identified transmission data amount in order of preference determined according to the identified service quality information.

(5) The signal string may be a signal string further representing information for identifying the wireless mobile station or information for identifying a connection of communication between the wireless base station and the wireless mobile station.

(6) Further, the signal string may be a signal string further representing information for identifying a modulation scheme and a coding scheme used in communication between the wireless base station and the wireless mobile station.

(7) In a method for allocating a wireless resource in a wireless communication system having a wireless base station and a wireless mobile station in a second mode, which is not limitative, the wireless mobile station transmits a first signal string representing a wireless resource allocation request and first information and a second signal string representing a wireless resource allocation request and second information differing from the first information at different transmission timings or at different frequencies to the wireless base station, and the wireless base station, when the first signal string and the second signal string are received at different reception timings according to the transmission timings or at the different frequencies from the wireless mobile station, identifies the first information and the second information represented by the respective signal strings, and controls allocation of a wireless resource to the wireless mobile station based on the identified information.

(8) Wherein, when the wireless base station fails to normally receive one of the first signal string and the second signal string, the wireless base station may identify information represented by the other signal string, and control the allocation of a wireless resource based on the identified information.

(9) Either the first information or the second information may be one of information for identifying the wireless mobile station, service quality information on transmission data to be transmitted from the wireless mobile station to the wireless base station, information relating to a transmission data amount of the transmission data, and information for identifying a modulation scheme and a coding scheme.

(10) Further, the wireless mobile station may transmit the first signal string and the second signal string to the wireless base station successively with respect to time.

(11) The different timings or the different frequencies may be designated by the wireless base station.

(12) Defined signal strings representing the service quality information that the wireless mobile station can choose may be increased in number as class of the service quality information is raised.

(13) In a first mode of a disclosed wireless mobile terminal, which is not limitative, the wireless mobile station comprises a generator that generates a signal string representing a wireless resource allocation request and service quality information on transmission data to be transmitted to the wireless base station, and a transmitter that transmits the signal string generated by the generator to the wireless base station.

(14) Wherein, the generator may generate a signal string further representing a transmission data amount of the transmission data.

(15) In a second mode of a disclosed wireless base station, which is not limitative, the wireless base station comprises a receiver that receives a signal string representing a wireless resource allocation request and service quality information on transmission data to be transmitted to the mobile base station transmitted from the mobile station, an identifier that identifies the service quality information based on the signal string received by the receiver, and a controller that controls allocation of an uplink wireless resource to the wireless mobile station based on the service quality information identified by the identifier.

(16) The controller may allocate an uplink wireless resource that the wireless mobile station can use to make a request to the wireless base station for an uplink wireless resource amount according to a transmission data amount of the transmission data in order of preference determined according to the identified service quality information.

(17) The received signal string may be a signal string further representing a transmission data amount of the transmission data, the identifier further may identify the transmission data amount based on the received signal string, and the controller may control the allocation of an uplink wireless resource according to the transmission data amount based on the identified service quality information and the identified transmission data amount.

(18) The controller may allocate an uplink wireless resource according to the identified transmission data amount in order of preference determined according to the identified service quality information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, embodiments will be described with reference to the drawings. Note that the present invention is not limited to the following embodiments, but may be modified in various ways without departing from the spirit and scope of the invention, as a matter of course.

[1] First Embodiment

Figure 1:
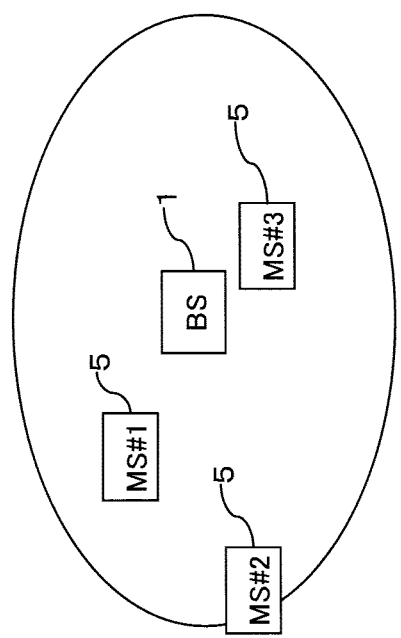
FIG. 1 Diagram illustrating an example of wireless communication system according to a first embodiment.

FIG. 1 is a diagram illustrating an example of wireless communication system according to a first embodiment. The wireless communication system illustrated in FIG. 1 has a wireless base station (BS) 1, one or more wireless mobile stations (MSs) 5 communicating by radio with the BS 1 within a service area of the BS 1, for example. In FIG. 1, there are illustrated three MSs 5, namely, MS #1, MS#2 and MS#3.

(Explanation of Bs)

Figure 2:
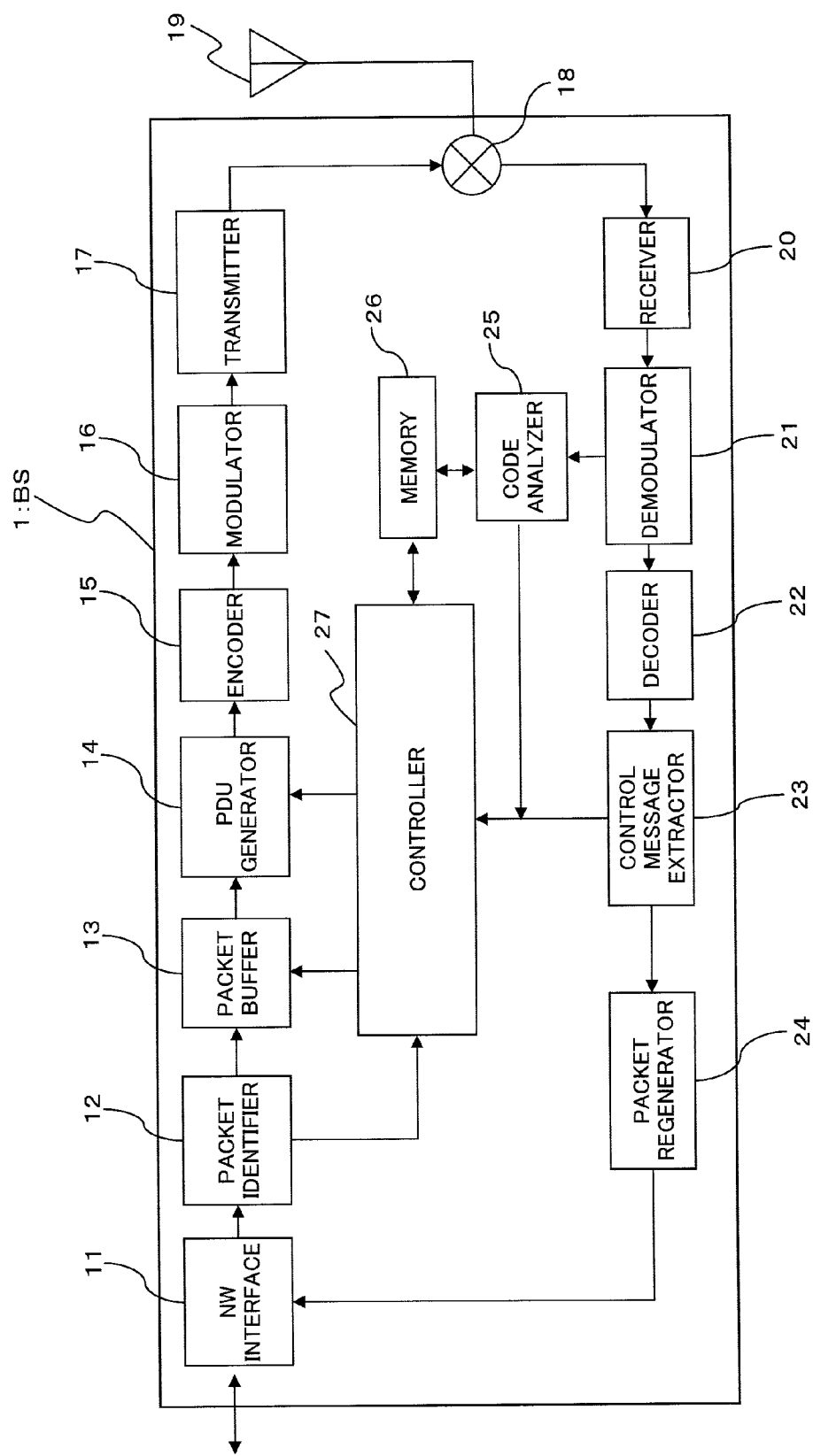
FIG. 2 Block diagram illustrating constitution of a wireless base station (BS) illustrated in FIG. 1.

As illustrated in FIG. 2, for example, the BS 1 has a network (NW) interface 11, a packet identifier 12, a packet buffer 13, a PDU generator 14, an encoder 15, a modulator 16, a transmitter 17, a duplexer 18, an antenna 19, a receiver 20, a demodulator 21, a decoder 22, a control message extractor 23, a packet regenerator 24, a code analyzer 25, a memory 26 and a controller 27.

The NW interface 11 forms an interface (here, packet communication being assumed to be performed) between the BS 1 and a router not illustrated (an apparatus connected to plural BSs to perform the route control on data such as packet data and the like).

The NW interface 11 has a function of transferring data (downlink data) received from the router and destined for the MS 5 to the packet identifier 12, while transmitting data (uplink data) received from the packet regenerator 24 to the router. Incidentally, a direction of communication from the BS 1 to the MS 5 is downlink (downlink: DL), whereas a direction, which is opposite to the former direction, from the MS 5 to BS is uplink (uplink: UL).

The packet identifier 12 identifies an IP address contained in packet data received from the NW interface 11, specifies (identifies) a destination MS 5 on the basis of IP address data, obtains QoS information corresponding to the specified MS 5, gives identification information (ID) and QoS information on the MS 5 and data size of the same to the controller to make a bandwidth allocation request, and stores the packet data fed from the NW interface 11 in the packet buffer 13.

Identification of the destination MS 5 is realized by storing association of the IP address data with information (MS-ID) for identifying the MS 5, and obtaining the corresponding MS-ID. By storing association of the MS-ID with QoS information (hereinafter, referred to as QoS class), QoS information on the MS 5 can be obtained.

The packet buffer 13 temporarily retains packet data transferred from the packet identifier 12 according to write and read control by the controller 27, and outputs the packet data to the PDU generator 14.

The PDU generator 14 generates PDU data so that transmission data of user data and control data is stored in a wireless frame formed on the basis of synchronizing signal (preamble), and outputs the PDU data to the encoder 15.

The encoder 15 performs a coding process such as error-correction code coding and the like on the PDU data generated by the PDU generator 14.

The modulator 16 modulates the PDU data encoded by the encoder 15 in a modulation scheme such as QPSK, 16QAM, 64QAM or the like.

The transmitter 17 performs radio transmission processes such as frequency conversion (up conversion) to a radio frequency, power amplification to a predetermined transmitting power, etc. on a modulation signal obtained by the modulator 16.

The duplexer 18 allows the antenna 19 to be shared by the transmission/reception systems. The duplexer 18 sends a radio signal (DL signal) from the transmitter 17 to the antenna 19, while sending a radio signal (UL signal) received by the antenna 19 to the receiver 20.

The antenna 19 transmits and receives radio signals to and from the MS 5.

The receiver 20 performs radio reception processes such low noise amplification, frequency conversion (down conversion) to base band signal, etc. on a ratio signal received via the antenna 19 and the duplexer 18.

The demodulator 21 has a function of demodulating a reception signal having undergone the radio reception processes, and outputting information on a CDMA code (signal string) such as a BR code or the like to the code analyzer 25, while outputting other messages to the decoder 22.

The decoder 22 decodes (performs error-correction code decoding) the reception signal demodulated by the demodulator 21.

The control message extractor 23 extracts control data (message) from the decoded data obtained by the decoder 22, and outputs the control data to the controller 27, while transferring other data such as user data and the like to the packet regenerator 24.

The packet regenerator 24 packetizes data transferred from the control data extractor 23, and outputs the packet to the NW interface 11.

The code analyzer (identifier) 25 has a function of identifying a type of the reception code from the demodulator 21, that is, identifying whether or not the reception code is BR code or the like, and identifying a QoS class thereof on the basis of data (code index data of each QoS class) in which QoS class is associated with code index as illustrated in Table 4 below, for example, when the reception code is a BR code, and giving this information to the controller 27. The data illustrated in Table 4 is stored in the memory 26 as data in table form, for example.

TABLE 4

Example of BR code corresponding to QoS class

| Code Index | Corresponding QoS |
|---|---|
| L to M − 1 | low |
| M to N − 1 | middle |
| N to P − 1 | high |
| . | . |
| . | . |
| . | . |

Figure 4:
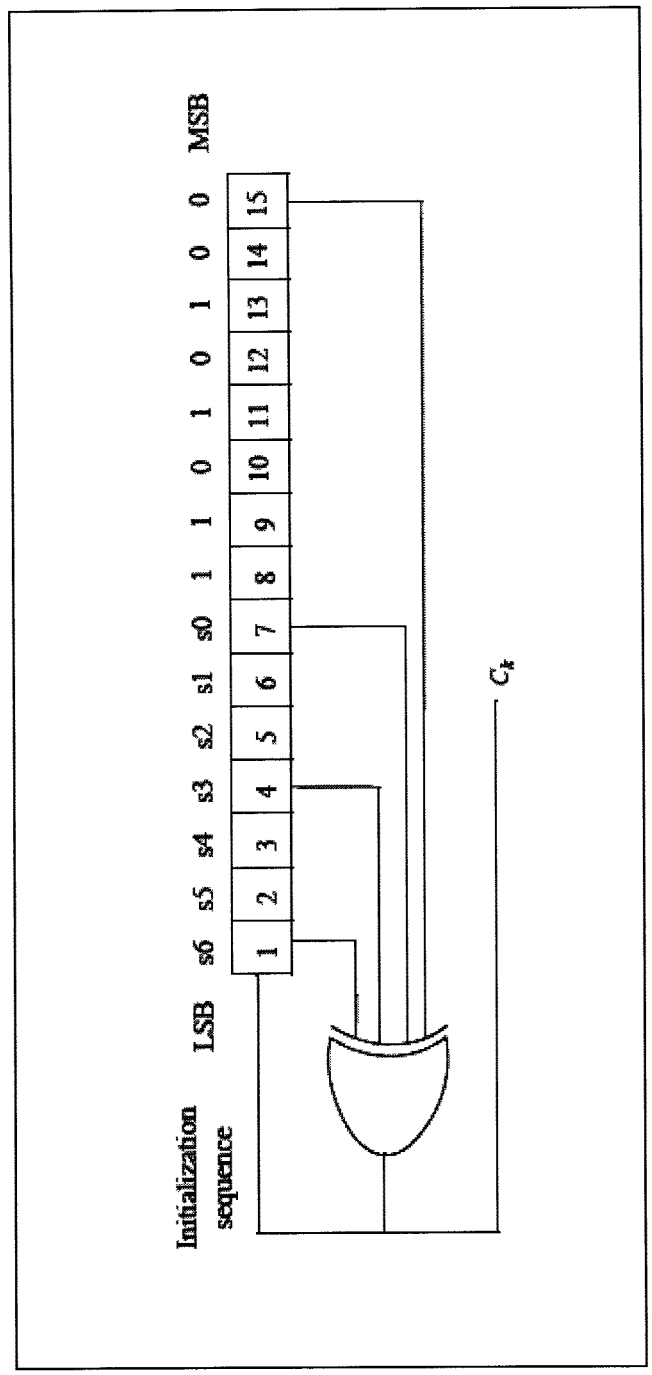
FIG. 4 Diagram illustrating an example of PRBS generator.

In Table 4, Code Index is number information (information representing which turn that the code is generated in) generated by a PRBS (Pseudo-Random Binary Sequence) generator illustrated in, for example, FIG. 4.

Namely, suppose CDMA code containing BR code is composed of 144 bits, and a maximum of 256 codes are definable. Each CDMA code is generated by shifting by 144 bits by the PRBS generator.

For example, the first CDMA code (code index=0) is composed of a bit string Ck generated by shifting the PRBS generator illustrated in FIG. 4 by 144 clocks and outputting. Similarly, the second CDMA code (code index=1) is an output Ck generated by shifting the PRBS generator by 145-288 clocks. As s6-s0 in "Initialization sequence" in FIG. 4, values informed from the BS 1 are used, for example.

In the example illustrated in Table 4, definition is such that Z codes from L to M−1 among 256 codes in the code index are designated as BR codes for low-class QoS, Y codes from M to N−1 are designated as BR codes for middle-class QoS, and X codes from N to P−1 are designated as BR codes for high-class QoS.

When transmission data in UL is present, the MS 5 chooses a BR code (hereinafter, referred simply as "code") in the code index corresponding to a QoS class of the transmission data and transmits the BR code to the BS 1. For example, the MS 5 chooses at random one of X BR codes, and transmits the chosen BR code to the BS 1.

For this reason, the MS 5 in this embodiment holds (shares) information equivalent to Table 4, as will be described later. The BR data of each QoS class is transmitted from the BS 1 to the MS 5. On this occasion, the BS 1 can use a message to be broadcasted to the MS 5 such as a UCD (Uplink Channel Descriptor) message, for example.

As another example, what can be used is a message in DL transmitted to individual MS 5 such as a ranging response (RNG-RSP) message that the BS 1 should transmit to the MS 5 in the course of connection process between the MS 5 and BS 1, or a dynamic service addition request/response (DSA-REQ/RSP) message that the BS 1 should transmit to the MS 5 in the course of a process (dynamic service addition process) to set (add) a new connection between the MS 5 and the BS 1.

Since the QoS class of a connection set by the BS 1 is determined when the connection is set between the MS 5 and the BS 1, for example, the MS 5 can determine a range of the BR code used for a bandwidth request with respect to the connection, along with information of a received UCD message.

BR codes associated with respective QoS classes may be of the same number, or part or all of the BR codes may be of different numbers. However, plural MSs 5 might choose the same code (index) at the same time. For this, it is preferable to set the number of codes for the high-class QoS greater than the number of codes for the lower-class QoS, for example, to decrease the probability of collision of codes.

In FIG. 2, the memory 26 stores various data (including data in Table 1 illustrated above) that the BS 1 should store. For example, the memory 26 stores function information on the MS 5 contained in control data received from the MS 5, authentication information, key information used for data encryption, wireless channel information, QoS information on connection, etc. The memory 26 stores information for managing availability (allocation) state of the wireless resource (band in UL/DL, etc.) at the BS 1, too.

The controller 27 controls operations of the BS 1 by suitably using various data stored in the memory 26, having functions of performing processes (a) to (d) below, for example.

(a) Function of selecting an MS 5 to which a bandwidth is to be allocated according to QoS information when receiving a bandwidth allocation request from the packet identifier 12 with respect to traffic in DL, and directing the packet buffer 13 and the PDU generator 14 to schedule transmission of user data.

(b) Function of generating control data. Like the user data, the generated control data is transmitted to the MS 5 via the encoder 15, the modulator 16, the transmitter 17, the duplexer 18 and the antenna 19.

(c) Function of generating allocation information (UL-MAP) for allocating a UL bandwidth to the MS 5 on the basis of information in a received BR code given from the code analyzer 25 and information in the BR header given from the control message extractor 23, with respect to traffic in the UL. This allocation process is executed preferentially on an MS having a higher QoS class in the received BR code in Table 1 illustrated above.

(d) Function of processing the received control data, that is, registration of functions (frequency, modulation scheme, coding rate, etc.) that the MS 5 supports, authentication of the MS 5, generation and exchange of encryption key, management of state of wireless channel, etc.

(Explanation of Ms)

Figure 3:
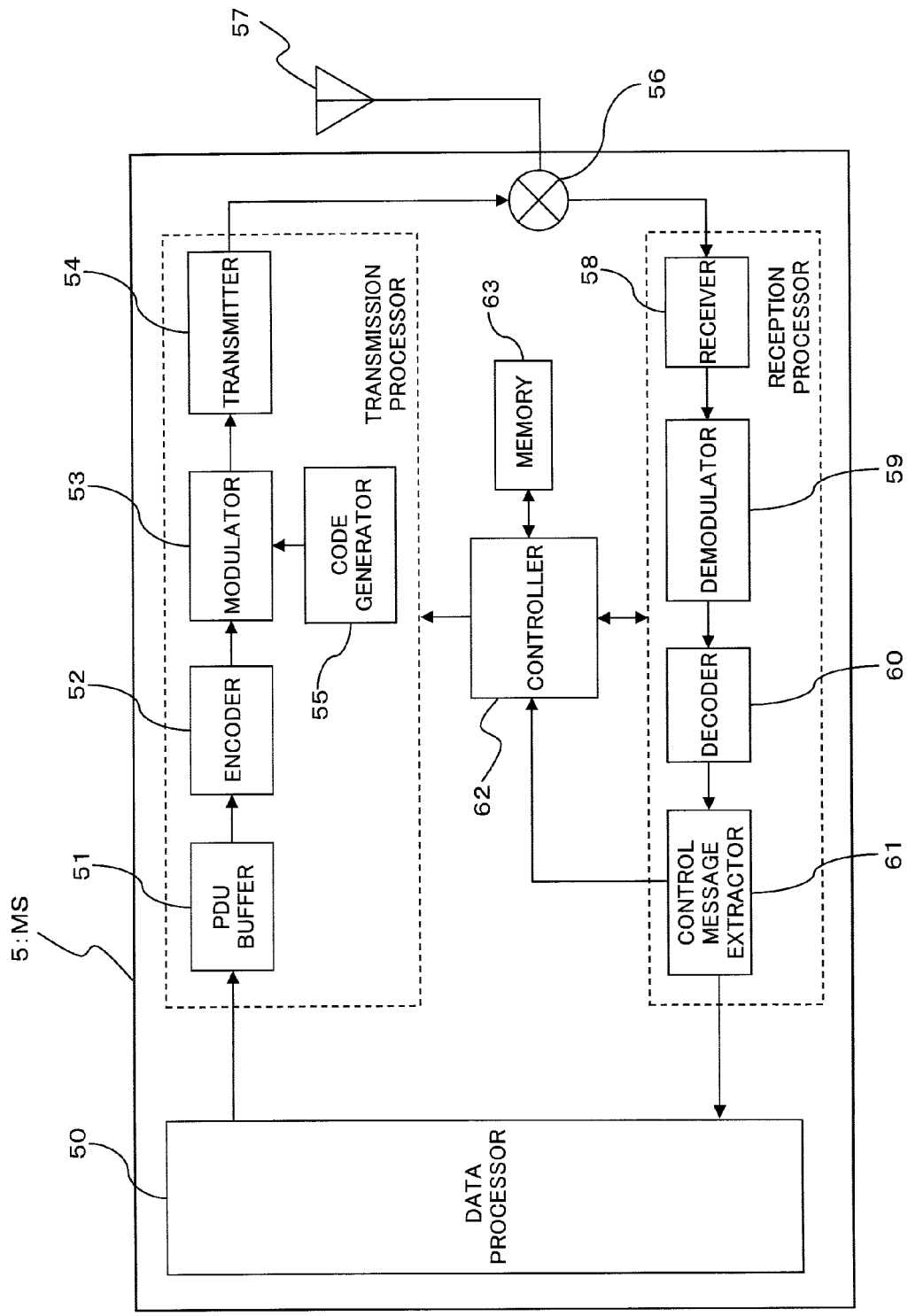
FIG. 3 Block diagram illustrating constitution of a wireless mobile station (MS) illustrated in FIG. 1.

As illustrated in FIG. 3, for example, the MS 5 in this embodiment has a data processor 50, a PDU buffer 51, an encoder 52, a modulator 53, a transmitter 54, a code generator 55, a duplexer 56, an antenna 57, a receiver 58, a demodulator 59, a decoder 60, a control message extractor 61, a controller 62 and a memory 63.

In FIG. 3, there are illustrated with broken lines that a block comprised of the PDU buffer 51, the encoder 52, the modulator 53, the transmitter 54 and the code generator 55 functions as a transmission processor, while a block comprised of the receiver 58, the demodulator 59, the decoder 60 and the control message extractor 61 functions as a reception processor. Hereinafter, the transmission processor and the reception processor are together generally called a transmission/reception processor, occasionally.

The data processor 50 has a function of performing a display process, speech output process, etc. on various data contained in data (DL data) received from the BS 1 and processed by the reception processor, and a function of outputting data (user data and the like in UL) destined for a destination apparatus (another MS 5, server or the like) to the PDU buffer 51.

The PDU buffer 51 stores transmission data transferred from the data processor 50 on the basis of control (write and read control) of the controller 62, and outputs the stored data to the encoder 52.

The encoder 52 performs encoding processes such as error correction code coding and the like on the transmission data from the PDU buffer 51 under control of the controller 62.

The modulator 53 performs a modulating process such as QPSK, 16QAM, 64QAM or the like on the transmission data encoded by the encoder 52 and a CDMA code (BR code) gene rated by the code generator 55 under control of the controller 62.

The transmitter 54 performs radio transmission processes such as frequency conversion (up conversion) to a radio frequency, power amplification to a predetermined transmitting power, etc. on the modulation signal obtained by the modulator 53.

The code generator (generator) 55 generates a CDMA code such as a BR code or the like under control of the controller 62. The code generator 55 generates a BR code (a signal string representing a bandwidth allocation request and service quality information on transmission data to be transmitted to the BS 1) corresponding to a QoS class of a connection necessary in the bandwidth allocation when allocation of a bandwidth in UL is required.

The duplexer 56 is provided to allow the transmission/reception processor to share the antenna 57. The duplexer 56 sends a radio signal (UL signal) from the transmitter 54 to the antenna 57, while sending a radio signal (DL signal) received by the antenna 57 to the receiver 58.

The antenna 57 transmits and receives radio signals to and from the BS 1.

The receiver 58 performs radio reception processes such as low-noise amplification, frequency conversion (down conversion) to a baseband signal, etc. on a radio signal received via the antenna 57 and the duplexer 56.

The demodulator 59 demodulates a reception signal having undergone the radio reception processes under control of the controller 62.

The decoder 60 decodes (performs error-correction code decoding) the reception signal demodulated by the demodulator 59 under control of the controller 62.

The control message extractor 61 extracts control data (message) from the decoded data obtained by the decoder 60 and outputs the control data to the controller 62, while transferring other data such as user data, etc. to the data processor 50.

The controller 62 controls operations of the MS 5 by suitably using various data stored in the memory 63. For example, the controller 62 has functions of performing processes (a) and (b) below.

(a) Function of processing control data transmitted and received to and from the BS 1, namely, registration of functions that the MS 5 supports, authentication, key generation and exchange, management of state of wireless channel.

(b) Function of controlling the transmission processor on the basis of allocation information (UL-MAP) on a bandwidth in UL received from the BS 1 to transmit user data or control data to the BS1. When allocation of a bandwidth is necessary, the controller 62 directs the transmission processor to transmit a BR code or BR header corresponding to a QoS class of a connection requiring the bandwidth allocation to BS.

The memory 63 stores various data required in operations of the MS 5. The memory 63 stores code index data of each QoS class in the above Table 1 in the BS 1, too. The controller 62 can specify a BR code corresponding to the QoS class on the basis of the code index data for each QoS class, and can make the code generator 55 generate the BR code.

The constitutions (functions) of the BS 1 and the MS 5 described above are similar in other embodiments to be described later excepting characteristic functions in the embodiments unless not specifically mentioned.

(Explanation of Operation)

Figure 5:
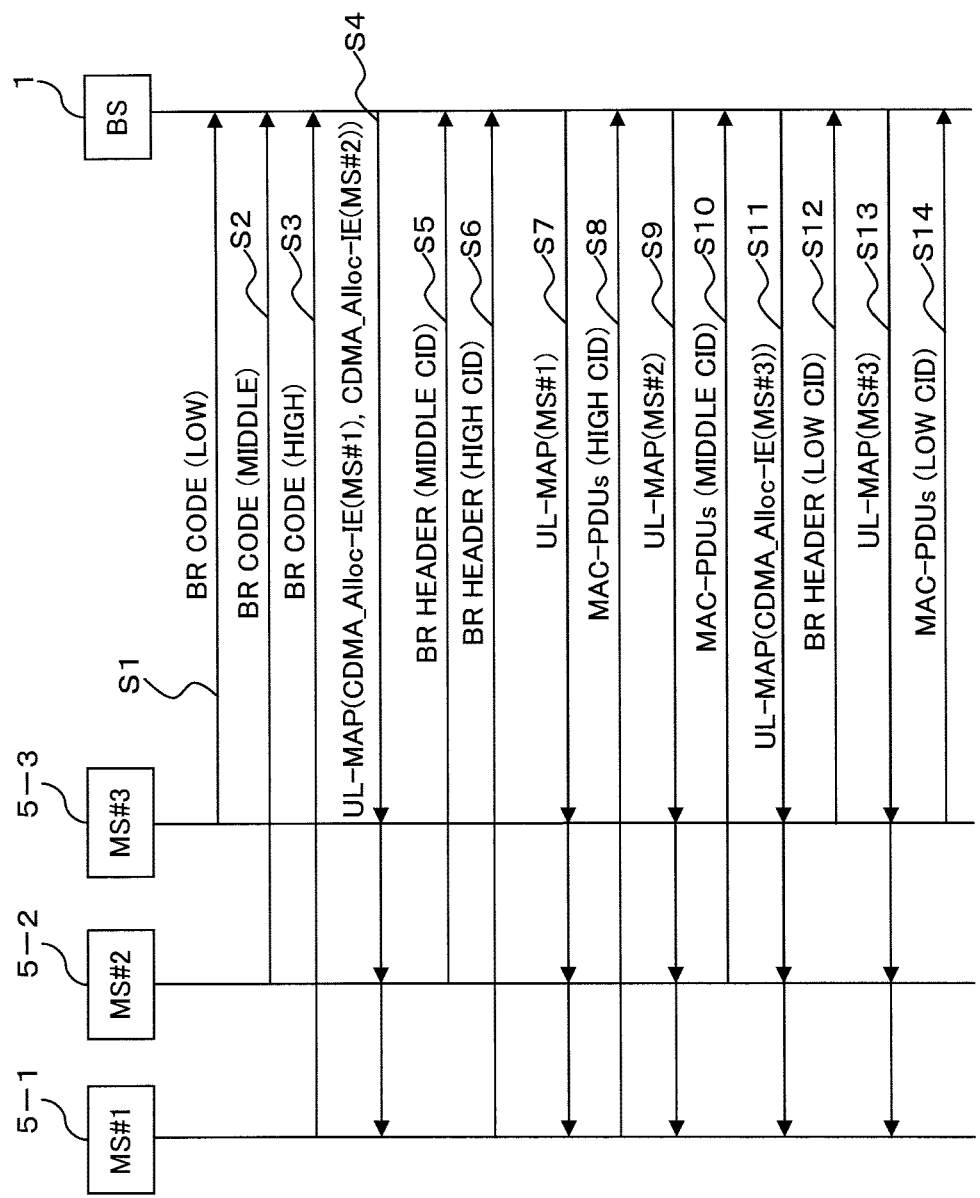
FIG. 5 Sequence diagram of a bandwidth allocation process between the BS and the MS in the wireless communication system according to the first embodiment.
Figure 6:
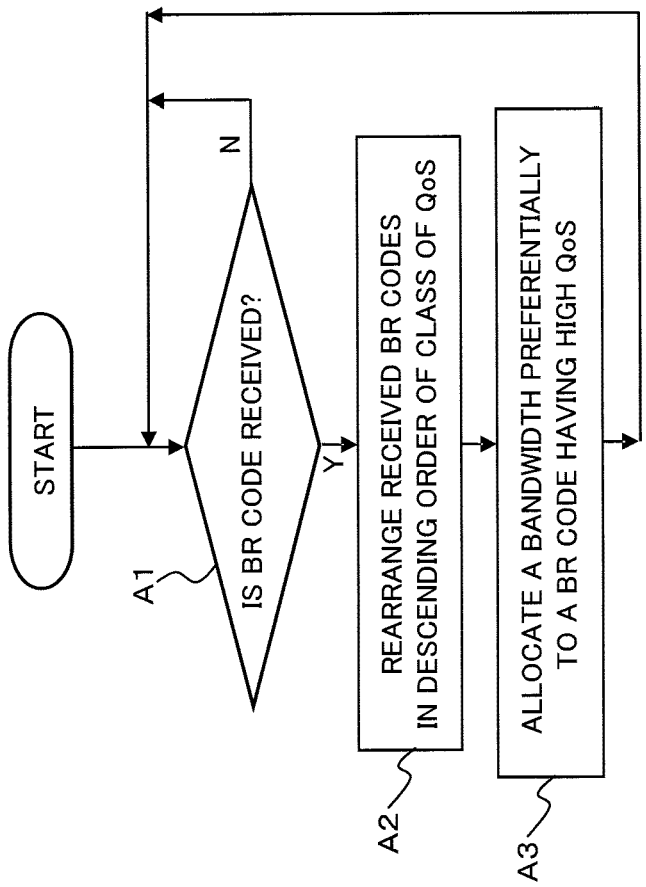
FIG. 6 Flowchart illustrating an operation of the BS when the BS receives a BR code according to the first embodiment.
Figure 7:
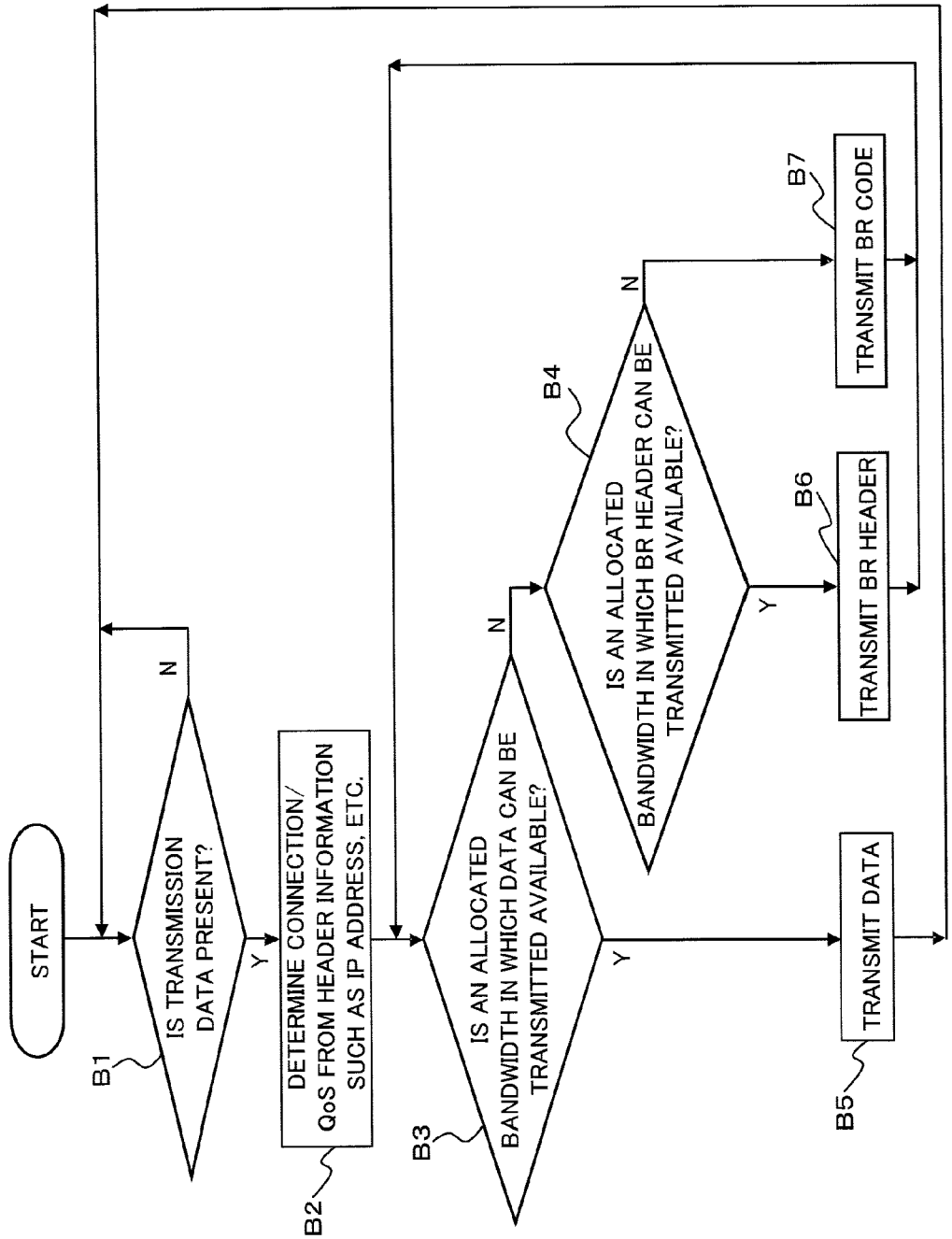
FIG. 7 Flowchart illustrating an operation of the MS when the MS makes a bandwidth request and performs a data transmission process to the BS according to the first embodiment.

Hereinafter, an operation (bandwidth allocation process) of the wireless communication system in this embodiment constituted as above will be described with reference to FIGS. 5 to 7. FIG. 5 is a sequence diagram of the bandwidth allocation process between the BS 1 and the MS 5. FIG. 6 is a flowchart illustrating an operation of the BS 1 when the BS 1 receives a BR code from the MS 5. FIG. 7 is a flowchart illustrating an operation of the MS 5 when the MS 5 makes a bandwidth request and performs a data transmission process to the BS 1.

As illustrated in FIG. 7, when data (UL data) to be transmitted to the BS 1 is present (Y route at step B1), the MS 5 (controller 62) determines a connection (CID) between the BS 1 and the MS 5 and QoS information from header information such as IP address or the like showing a destination of the transmission data (step B2). Incidentally, presence/absence of the transmission data can be confirmed by monitoring whether data is stored in the PDU buffer 51 or not, for example.

The MS 5 (controller 62) confirms whether a wireless resource (bandwidth) in UL is allocated by the BS 1 or not (step B3).

When a wireless resource with which at least part of the generated UL data can be transmitted has been already allocated, as a result, the MS 5 transmits the data to the BS 1 with the use of the allocated wireless resource (from Y route at step B3 to step B5). When a wireless resource for the remaining data is not allocated, it is preferable that the MS 5 secure a wireless resource (UL bandwidth) for transmission of a BR header or the like, and transmit the BR header or the like.

On the other hand, when a wireless resource which is not enough to transmit the UL data but is enough to transmit the BR header has been already allocated, the MS 5 transmits the BR header to the BS 1 to request allocation of the wireless resource (UL bandwidth) for data transmission (N route at step B3, and from Y route at step B4 to step B6).

When the wireless resource which is necessary to transmit the BR header is not allocated, the MS 5 (controller 62) makes the code generator 55 generate a BR code corresponding to a QoS class of the transmission data on the basis of the code index data for each QoS class (refer to Table 1 above) in the memory 62, and transmits the BR code to the BS 1 to request allocation of a UL bandwidth with which at least the BR header can be transmitted (from N routes at step B3 and step B4 to step B7).

Suppose that, among three MSs (#1, #2 and #3) 5-1, 5-2 and 5-3, the MS 5-1 is set a connection of the high-class QoS thereto, the MS 5-2 is set a connection of the middle-class QoS thereto and the MS 5-3 is set a connection of the low-class QoS thereto, and the MSs 5-1, 5-2 and 5-3 execute the above step B7 to generate BR codes for requesting wireless resources (UL bandwidths) for the respective connections and transmit the BR codes to the BS 1 (step S1 to S3). Note that the order in which the MSs 5-1, 5-2 and 5-3 transmit the BR codes on such occasion is ignorable.

In this case, rank of the QoS classes corresponding to the BR codes that the MSs 5-1, 5-2 and 5-3 (hereinafter, referred simply as "MS 5" when not discriminated) have transmitted is in the order of 5-1, 5-2 and 5-3.

In the BS 1 having received the BR codes from the MSs 5-1, 5-2 and 5-3, the code analyzer 25 analyzes the BR codes to identify QoS classes of the BR codes, and gives information on the QoS classes to the controller 27.

The controller 27 rearranges the received BR codes in descending order of rank of the QoS classes on the basis of the information given from the code analyzer 25 as illustrated in FIG. 6 (from Y route at step A1 to step A2), confirms a state (available wireless resource amount) of use (allocation) of the wireless resource on the basis of data stored in the memory 26, executes the scheduling process so as to allocate a bandwidth in preference to an MS 5 (connection) of the high-class QoS according to the state, generates and transmits a UL-MAP message containing allocation information on a wireless resource with which the MS 5 can transmit the BR header (step A3).

Namely, the controller 27 allocates bandwidths (UL bandwidths) for transmitting BR headers, by which the MSs 5 can make requests to the BS 1 for allocation of wireless resources in UL according to the transmission data amounts, on the basis of the BR codes received from the MSs 5 in the order of preference determined according to the identified QoS classes.

In the example in FIG. 5, the BS 1 allocates wireless resources, with which the MS 5-1 of the high-class QoS and the MS 5-2 of the middle-class QoS can transmit at least BR headers, to the MS 5-1 and the MS 5-2 with the use of "CDMA_Allocation-IE" in UL-MAP message (step S4). Namely, the controller 27 puts off allocation of a wireless resource to the MS 5-3 of the low-class QoS.

Alternatively, the BS 1 can put off allocation of a wireless resource to the MS 5-2 of the middle-class QoS, giving the highest preference to the MS 5-1 of the high-class QoS. In the case where the available wireless resource would be consumed or run short when a wireless resource is allocated to the MS 5-1 of the high-class QoS, allocation of a wireless resource to the MS 5-2 of a QoS class lower than that of the MS 5-1 can be put off.

When the wireless resource would run short, bandwidth allocation is possible with only available wireless resource at that time. Further, when plural MSs 5 (connections) of the same QoS class are present, allocation can be done in any order. For example, the allocation can be done in the order in which the BR codes have been received.

Reception of only BR code does not enable the BS 1 (controller 27) to specify which one of the MSs 5-1, 5-2 and 5-3 has transmitted the BR code or which burst profile is available. Incidentally, burst profile signifies a combination of modulation scheme and coding scheme (including coding rate).

For this reason, it is preferable that the BS 1 (controller 27) put information (code index, reception frame number of code, sub channel number, symbol number, etc.) relating to the received BR code into the UL-MAP message (CDMA_Allocation-IE) [CDMA_Allocation-IE(MS#1), CDMA_Allocation-IE(MS#2) representing this meaning in FIG. 5].

Whereby, the MS 5 can discriminate whether CDMA_Allocation-IE in the received UL-MAP message is addressed to its own station or not. As the burst profile, one that the MSs 5 support in common, preferably, one that has the best resistance to noise and propagation loss (for example, QPSK, coding rate ½) should be selected.

The MSs 5-1 and 5-2 which are allocated wireless resources for BR header transmission by the BS 1, transmit BR headers by executing the step B6 in FIG. 7 (steps S5 and S6).

The BS 1 (controller 27) having received the BR headers specifies the MSs 5-1 and 5-2 having transmitted the BR headers from CIDs contained in the BR headers, determines wireless resources to be allocated to the MSs 5-1 and 5-2 on the basis of wireless resource amounts necessary to transmit data amounts requested by the BR headers and an available wireless resource amount, and allocates wireless resources with the use of UL-MAP messages. In the example illustrated in FIG. 5, the BS 1 first executes allocation of an UL bandwidth to a connection of the MS 5-1 of the high-class QoS (step S7).

The MS 5-1 executes step B5 illustrated in FIG. 7 to transmit UL data (MAC-PDU) in the UL bandwidth allocated by the UL-MAP message (step S8).

After transmission of the UL data from the MS 5-1 is completed, the BS 1 performs allocation of an UL bandwidth to a connection of the MS 5-2 of the middle-class QoS in the same manner as the MS 5-1 (step S9). The MS 5-2 executes step B5 illustrated in FIG. 7 to transmit UL data (MAC-PDU) in an UL bandwidth allocated by the UL-MAP message (step S10).

After transmission of UL data from the MS 5-2 is completed, the BS 1 (controller 27) starts the bandwidth allocation process for a BR code received from the MS 5-3 of the low-class QoS.

Namely, the controller 27 confirms the state of use (allocation) of the wireless resource on the basis of data stored in the memory 26, schedules bandwidth allocation to a connection of the low-class QoS according to the state of availability, generates an UL-MAP message containing allocation information (CDMA_Allocation-IE) on a UL bandwidth with which the MS 5-3 can transmit a BR header, and transmits the UL-MAP message (step S11).

When receiving the UL-MAP message, the MS 5-3 executes the step B6 illustrated in FIG. 7 to transmit the BR header (step S12).

The BS 1 (controller 27) having received the BR header transmitted from the MS 5-3 specifies the MS 5-3 having transmitted the BR header from CID contained in the BR header, determines a wireless resource amount to be allocated to the MS 5-3 on the basis of a wireless resource amount necessary to transmit a data amount requested by the BR header and an available resource amount, and allocates an UL bandwidth with the use of UL-MAP message (step S13).

The MS 5-3 executes the step B5 illustrated in FIG. 7 to transmit UL data (MAC-PDU) in an UL bandwidth allocated by the UL-MAP message (step S14).

In the example illustrated in FIG. 5, the BS 1 (controller 27) starts the bandwidth allocation process for a connection of a lower-class QoS after completion of the UL data transmission from the MS 5-1 (5-2) allocated the UL bandwidth. Alternatively, the BS 1 can start the bandwidth allocation process for a connection [MS 5-2 (MS 5-3)] of a lower-class QoS at an earlier timing, not waiting completion of the transmission, in consideration of a delay time (for example, time-out time or the like on the occasion of retransmission at TCP to be described later) generating from when the MS 5-1 (5-2) transmits the BR code to when a bandwidth is allocated by receiving a UL-MAP message (CDMA_Allocation-IE).

According to this embodiment, the BR code is associated with a QoS class and defined, as above. Whereby, the MS 5 can notify the BS 1 of a QoS class of data to be transmitted to the BS 1 with the use of a BR code, whereas the BS 1 can identify the QoS class of the MS 5 (connection) requesting bandwidth allocation when successfully receiving the BR code.

Therefore, allocation of a UL bandwidth necessary to transmit a BR header from an MS 5 to the BS 1 can be executed in preference to a connection (MS 5) having a higher-class QoS. Accordingly, a connection of a higher-class QoS is apt to be allocated a necessary UL bandwidth thereto, while a connection of a lower-class QoS is not preferentially allocated a bandwidth thereto more than necessary. Further, the higher the rank of QoS class of a connection, the shorter a delay generated in allocating a bandwidth to the connection can be.

[2] Second Embodiment

In the first embodiment, the BR code is associated with a QoS class and defined, thereby to represent a bandwidth allocation request and the QoS class. The BS 1 having received the BR code can suitably allocate a wireless resource (UL bandwidth) in consideration of the QoS class.

In this embodiment, the BR code is associated with a transmission data amount (for example, the number of bytes) that the MS 5 requests and defined, thereby to represent a bandwidth allocation request and a transmission data amount. Whereby, the BS 1 having received the BR code can identify the transmission data amount and allocate a necessary UL bandwidth to the MS 5.

In this embodiment, as a CDMA code (BR code) to be transmitted when the MS 5 makes a request to the BS 1 for bandwidth allocation, a BR code (code index) is defined for each transmission data amount (requested size), and information thereon (code index data for each requested size) is shared by the BS 1 and the MS 5.

The code index data for each requested size can be contained in a broadcast message such as the above-described UCD message or the like, for example, and can be notified to the MS 5. Alternatively, can be used is the above-described ranging response (RNG-RSP) message, dynamic service addition request/response (DSA-REQ/RSP) message or DL message addressed to another MS 5 individually.

The code index data for each request size is stored and managed in the memory 26 of the BS 1 and the memory 63 of the MS 5.

Consequently, when data to be transmitted to the BS 1 is present, the MS 5 (controller 62) makes the code generator 55 generate a BR code corresponding to a transmission data amount (requested size) on the basis of the code index data for each requested size in the memory 62, and transmits the BR code to the BS 1.

On the other hand, when receiving the BR code from the MS 5, the BS 1 (controller 27) specifies a corresponding requested size on the basis of the code index data for each requested size in the memory 26, and executes allocation of a UL bandwidth for data transmission according to the requested size.

Figure 8:
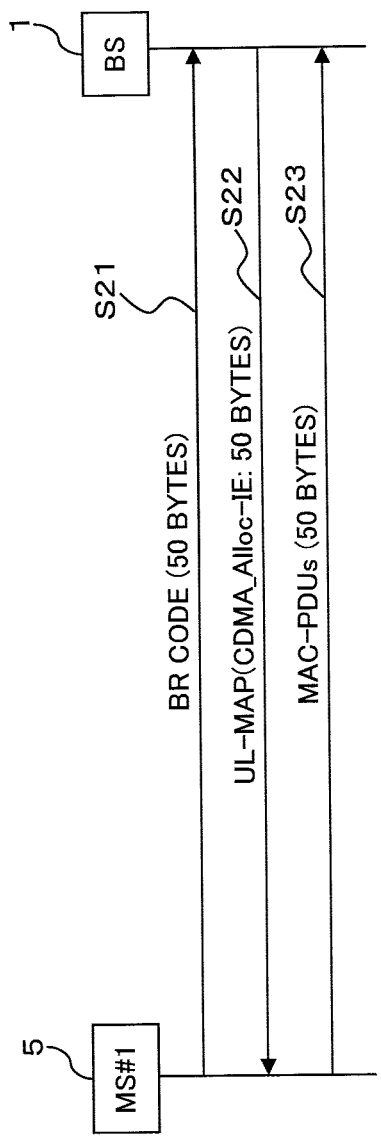
FIG. 8 Sequence diagram of a bandwidth allocation process between the BS and the MS in the wireless communication system according to a second embodiment.
Figure 9:
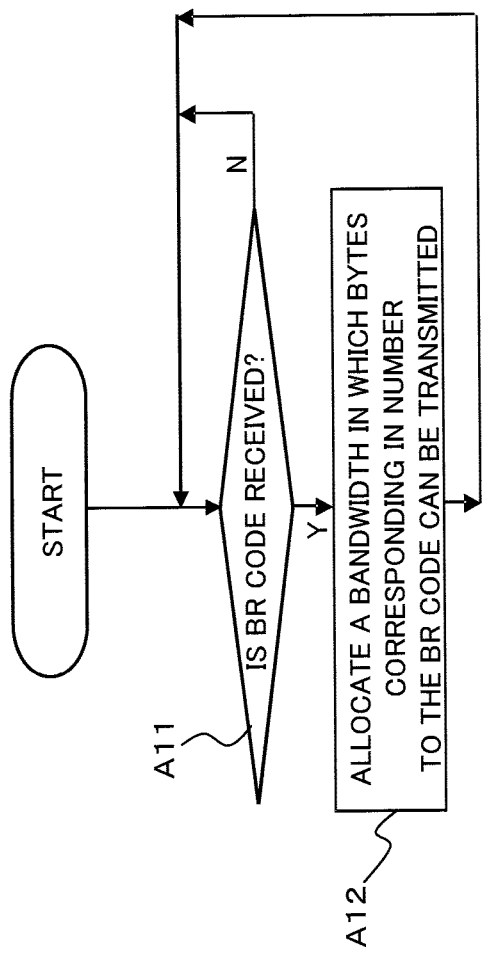
FIG. 9 Flowchart illustrating an operation of the BS when the BS receives a BR code according to the second embodiment.
Figure 10:
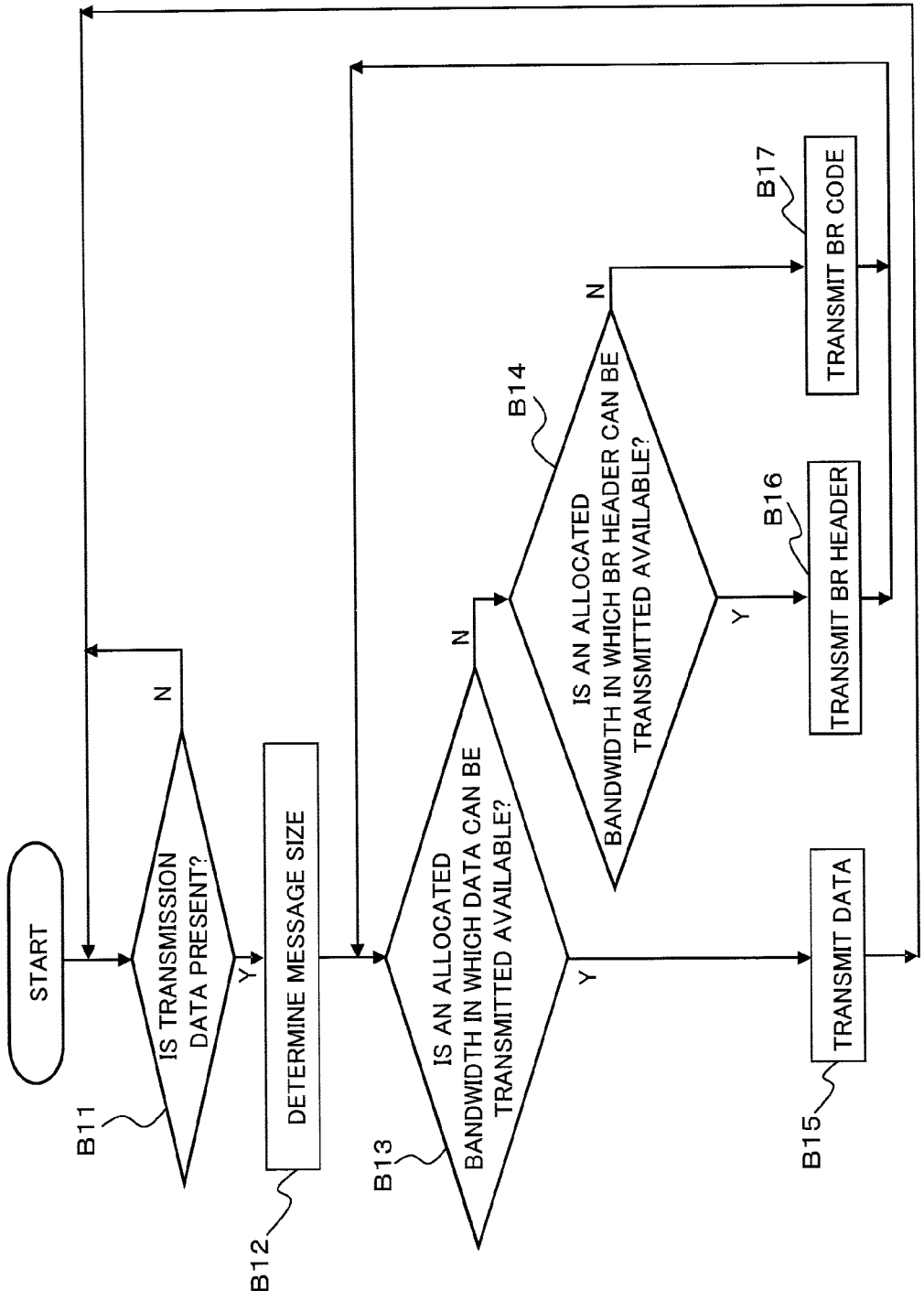
FIG. 10 Flowchart illustrating an operation of the MS when the MS makes a bandwidth request and performs a data transmission process to the BS according to the second embodiment.

Hereinafter, an operation (bandwidth allocation process) according to this embodiment will be described with reference to FIGS. 8 to 10. FIG. 8 is a sequence diagram of the bandwidth allocation process between the BS 1 and the MS 5. FIG. 9 is a flowchart illustrating an operation of the BS 1 when the BS 1 receives a BR code from the MS 5. FIG. 10 is a flowchart illustrating an operation of the MS 5 when the MS 5 makes a bandwidth request to the BS 1 and executes a data transmission process.

As illustrated in FIG. 10, when data (UL data) to be transmitted to the BS is generated (Y route at step B11), the MS 5 (controller 62) calculates and determines a data size of the transmission data encapsulated in MAC-PDUs to be transferred on a wireless link (UL) between the MS 5 and the BS 1 (step B12). In this embodiment, presence and absence of UL data can be confirmed by monitoring whether data is stored in the PDU buffer 51, for example, like the above embodiment.

The MS 5 (controller 62) confirms whether a wireless resource (UL bandwidth) with which the UL data can be transmitted is allocated by the BS 1 (step B13).

When an UL bandwidth enough to transmit at least part of the generated UL data is already allocated, as a result, the MS 5 transmits the data to the BS 1 with the use of the allocated UL bandwidth (from Y route at step B13 to step B15). When an UL bandwidth for the remaining data is not allocated on this occasion, it is preferable that the MS 5 secure an UL bandwidth to transmit the BR header and the like, and transmit the BR header.

On the other hand, when a wireless resource in amount that is not enough to transmit the UL data but is enough to transmit the BR header is already allocated, the MS 5 transmits the BR header to the BS 1, and requests allocation of a wireless resource (from N route at step B13 and Y route at step B14 to step B16).

When a wireless resource necessary to transmit the BR header is not allocated, the MS 5 (controller 62) makes the code generator 55 generate a BR code corresponding to a size (for example, assumed to be 50 bytes) of the transmission data on the basis of the code index data for each request size in the memory 62, and transmits the BR code to the BS 1 (from N routes at steps B13 and B14 to step B17).

As illustrated in FIG. 8, for example, the MS 5 transmits a BR code representing a wireless resource request for transmitting data of 50 bytes (step S21).

When receiving the BR code (Y route at step A11 in FIG. 9), the BS 1 specifies a data size (50 bytes) corresponding to the received BR code on the basis of the code index data for the requested size in the memory 26, determines a wireless resource (UL bandwidth) with which this data size can be transmitted, and transmits this allocation information with the use of a UL-MAP message (CDMA_Allocation-IE) (step A12 in FIG. 9 and step S22 in FIG. 8).

In the example illustrated in FIG. 8, "UL-MAP (CDMA_Allocation-IE:50 bytes)" signifies that a wireless resource for transferring data of 50 bytes is allocated. Incidentally, the allocated wireless resource can be expressed by the number of slots (the same shall apply hereinafter).

On this occasion, the BS 1 (controller 27) cannot specify which one of the MSs 5-1, 5-2 and 5-3 has transmitted the BR code and which burst profile is available, from only the received BR code.

In this embodiment, it is preferable that the BS 1 (controller 27) put information (code index, reception frame number of code, sub channel number, symbol number, etc.) relating to the received BR code in a UL-MAP message (CDMA_Allocation-IE). Whereby, the MS 5 can discriminate whether the received UL-MAP message is addressed to its own station or not. As to burst profile, one that the MSs 5 support in common, preferably, one that has the best resistance to noise and propagation loss (for example, coding rate ½) should be selected.

The MS 5 executes step B15 illustrated in FIG. 10 to transmit UL data (MAC-PDU) in an UL bandwidth allocated by the UL-MAP message (step S23 in FIG. 8). Namely, the BS 1 is not required to allocate an UL bandwidth with which the MS 5 transmits a BR header, while the MS 5 is not required to transmit the BR header to the BS 1.

As stated above, according to this embodiment, the BR code is associated with a transmission data amount (size) requested by the MS 5 and is defined, whereby the MS 5 can notify the BS 1 of the transmission data size. The BS 1 can discriminate the transmission data size that the MS 5 desires to transmit through a connection at which bandwidth allocation is requested when successfully receiving the BR code.

The BS 1 can allocate a necessary amount of wireless resource without receiving the BR header from the MS 5, which makes it possible to shorten the time required to allocate a wireless resource to the MS 5.

The BS 1 does not need to allocate an UL bandwidth to be used by the MS 5 to transmit a BR header, while the MS 5 does not need to transmit the BR header. This is helpful to suppress waste of the UL bandwidth between the BS 1 and the MS 5 and to effectively use the same.

For example, it is assumed that TCP (Transport Control Protocol) session used when the MS 5 makes a Web access or the like is established. In such case, the MS 5 performs three-way hand shake where the MS 5 transmits TCP synchronization (TPC:SYN) message to the BS 1, receives TCP synchronization acknowledgement (TCP:SYN-ACK) message from the BS 1, then transmits TCP acknowledgement (TCP:ACK) message.

It is known that a message of SYN and ACK that the MS 5 transmits in this course has a very short packet length. For example, this message is data of 20 bytes of IPv4 protocol header and 20 bytes of TCP header, totaling 40 bytes. This data is of only about to 60 bytes even when a header, a CRC (Cyclic Redundancy Check) code and other information added when the data is encapsulated in a data format at the time of transfer on a wireless link are included.

In TCP, round trip time (Round Trip Time: RTT) is measured and used in calculation of a retransmission time-out value. Accordingly, if a time required until TCP layer of the MS 5 calls TCP synchronization (TCP:SYN) to hand it to the lower IP layer, transmits it via MAC/PHY layer of IEEE802.16 and receives TCP synchronization acknowledgement (TCP:SYN-ACK) becomes long, the time-out time on the occasion of retransmission of TCP becomes unnecessarily long, which degrades the service quality. If BR header (six bytes) is transmitted in order to transmit such a short message, the overhead becomes relatively large.

As described above, by notifying the BS 1 of a data size to be transmitted from the MS 5 to the BS 1, it becomes possible to shorten a delay generated until the MS 5 establishes a TCP session and starts data transmission to the BS 1. Further, it becomes possible to suppress degradation of the service quality resulting from that the retransmission time-out value based on RTT in TCP becomes unnecessarily long.

Further, since the MS 5 does not need to further transmit a BR header in order to transmit an uplink message (TCP synchronization message, TCP synchronization acknowledgement message, TCP acknowledgement message, etc.) in a data size of about 50 to 60 bytes for establishment of a TCP session, which leads to efficient use of the wireless resource between the BS 1 and the MS 5.

[3] Third Embodiment

In this embodiment, a combination of the first embodiment and the second embodiment is described. In other words, a BR code is defined so as to represent a bandwidth allocation request, a QoS class of the MS 5 (connection) and a transmission data amount (requested size) for which the MS 5 is making a request to the BS 1.

Table 5 below illustrates an example of BR code corresponding to QoS class and requested size.

TABLE 5

Example of BR code corresponding to QoS class and requested size

| Code Index | Corresponding QoS | Requested size (bytes) |
| --- | --- | --- |
| L to M − 1 | low | 6 |
| M to N − 1 | low | 60 |
| N to P − 1 | middle | 6 |
| P to Q − 1 | middle | 60 |
| Q to R − 1 | high | 6 |
| R to S − 1 | high | 60 |
| . | . | . |
| . | . | . |
| . | . | . |

In the example illustrated in Table 5, a BR code at L to M−1 in Code Index represents that the QoS is low and the requested size is six bytes. A BR code at M to N−1 in Code Index represents that the QoS is low and the requested size is 60 bytes. Likewise, a BR code at N to P−1 in Code Index represents that the QoS is middle and the requested size is six bytes, a BR code at P to Q−1 represents that the QoS is middle and the requested size is 60 bytes, a BR code at Q to R−1 represents that the QoS is high and the requested size is six bytes, and a BR code at R to S−1 represents that the QoS is high and the requested size is 60 bytes.

In this example, BR codes associated with respective classes may be of the same number, or part or all of the BR codes may be of different numbers. Like the first embodiment, the number of codes for higher-class QoS may be set to a number larger than that of codes of lower-class QoS to decrease probability of collision of the codes.

The example in Table 5 illustrates a case where the requested size is only two kinds, that is, six bytes and 60 bytes. However, a different BR code can be defined for each requested size, of course.

In this example, data (QoS class and code index data for each requested size) defined as illustrated in Table 5 above is stored and managed in the memory 26 of the BS 1 and the memory 63 of the MS 5 to be shared by the BS 1 and the MS 5.

The QoS class and code index data for each requested size can be put in a UCD message, ranging response (RNG-RSP) message, dynamic service addition request/response DSA-REQ/RSP) message described above to be notified to the MS 5.

When data to be transmitted to the BS 1 is present, the MS 5 (controller 62) makes the code generator 55 generate a BR code corresponding to a QoS class and a transmission data amount (requested size) on the basis of the QoS class and the code index data for each requested size in the memory 62, and transmits the BR code to the BS 1.

On the other hand, when receiving the BR code from the MS 5, the BS 1 (controller 27) specifies a corresponding QoS class and requested size on the basis of the QoS class and the code index data for each requested size in the memory 26, and allocates a wireless resource (UL bandwidth) corresponding to the QoS class and the requested size.

Figure 11:
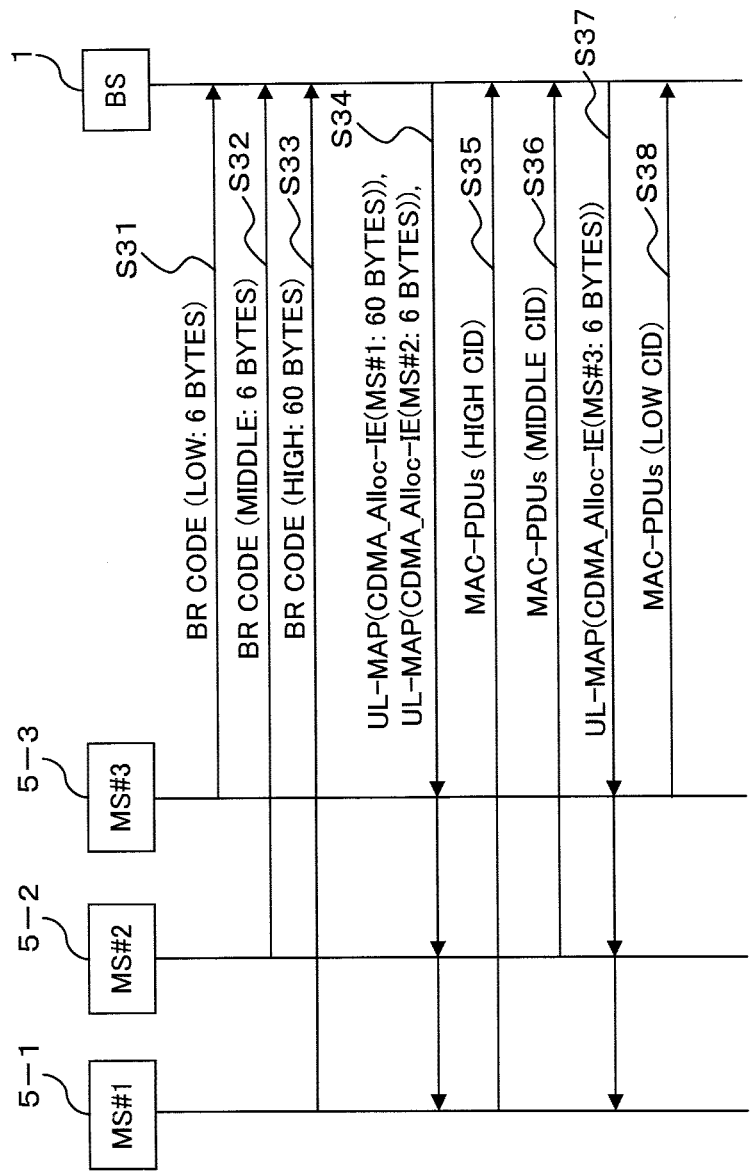
FIG. 11 Sequence diagram of a bandwidth allocation process between the BS and the MS in the wireless communication system according to a third embodiment.
Figure 12:
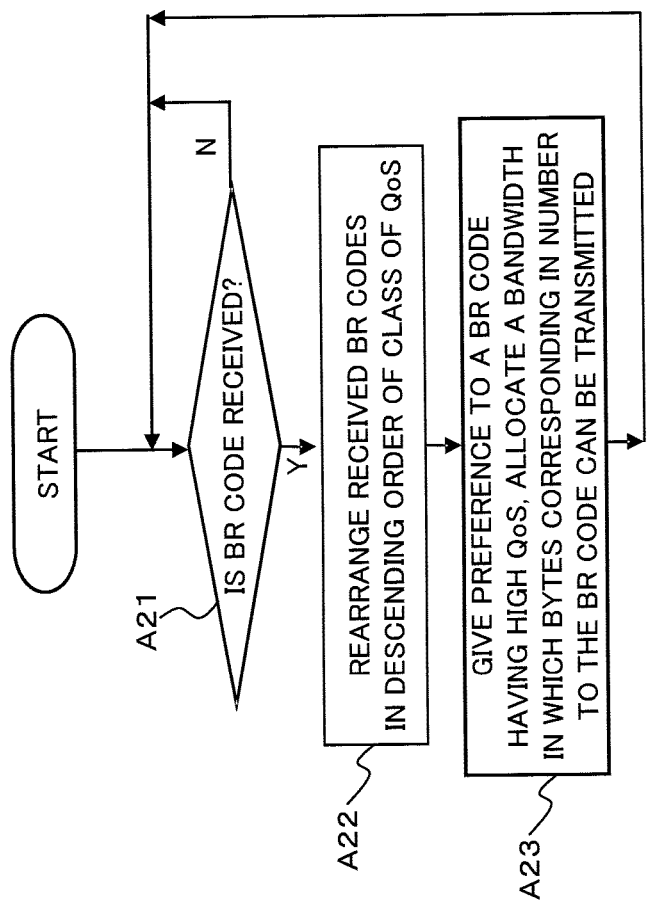
FIG. 12 Flowchart illustrating an operation of the BS when the BS receives a BR code according to the third embodiment.
Figure 13:
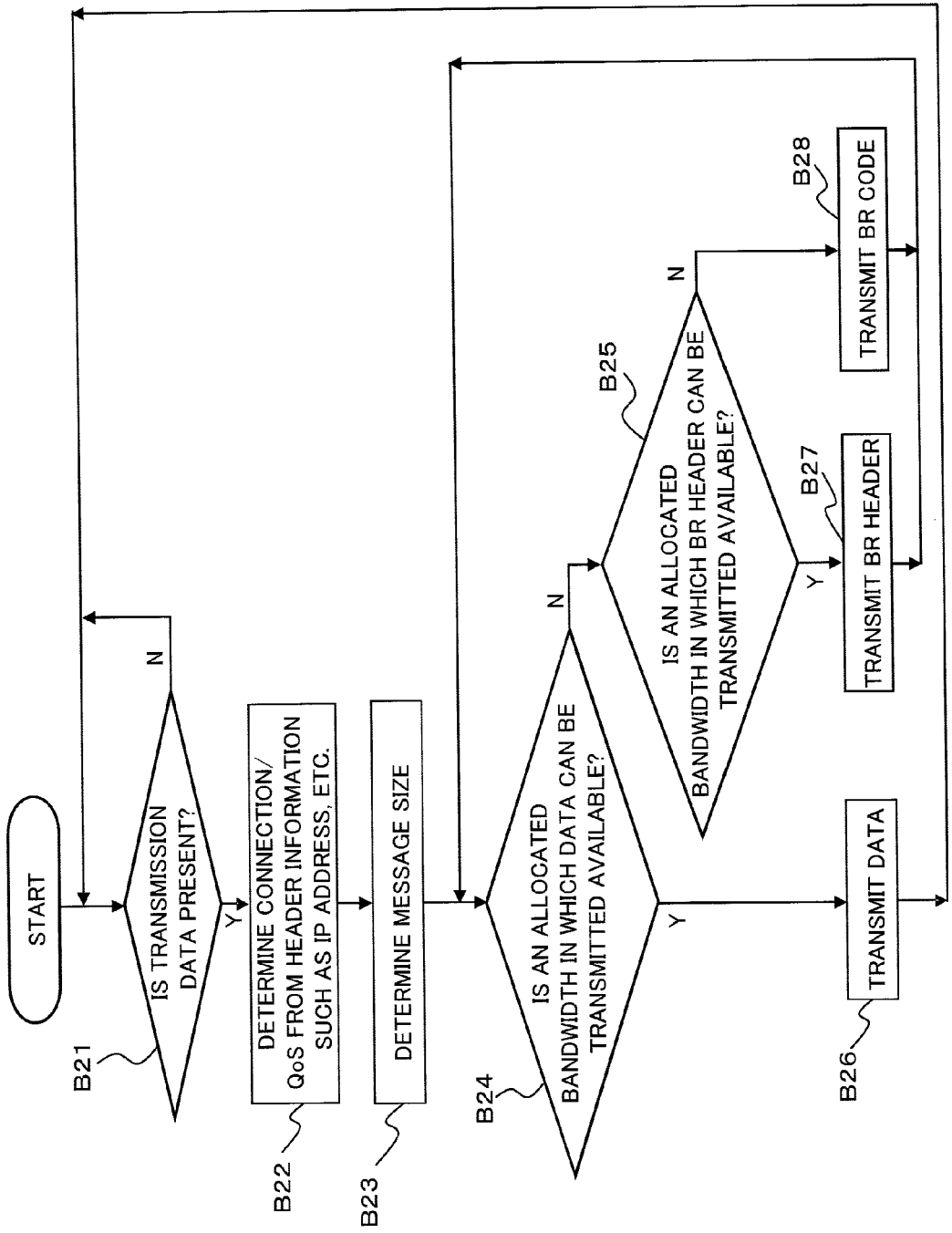
FIG. 13 Flowchart illustrating an operation of the MS when the MS makes a bandwidth request and performs a data transmission process to the BS according to the third embodiment.

Hereinafter, an operation (bandwidth allocation process) in this embodiment will be described with reference to FIGS. 11 to 13. FIG. 11 is a sequence diagram of the bandwidth allocation process between the BS 1 and the MS 5. FIG. 12 is a flowchart illustrating a process of the BS 1 when the BS 1 receives a BR code from the MS 5. FIG. 13 is a flowchart illustrating a process of the MS 5 when the MS 5 makes a bandwidth request and performs a data transmission process to the BS 1.

As illustrated in FIG. 13, when data (UL data) to be transmitted to the BS 1 is generated (Y route at step B21), the MS 5 (controller 62) determines a connection (CID) between the BS 1 and the MS 5 and QoS information from header information such as IP address and the like representing a destination of the transmission data (step B22), and calculates and determines a data size of the transmission data when the data is encapsulated in MAC-PDUs to be transferred on a wireless link (UL) between the MS 5 and the BS (step B23). The order of the processes at steps B22 and B23 is ignorable, and can be executed at the same time. Presence/absence of the UL data can be confirmed by monitoring whether data is stored in the PDU buffer 51 or not, for example.

The MS 5 (controller 62) confirms whether a wireless resource (UL bandwidth) with which the UL data can be transmitted is allocated by the BS 1 or not (step B24).

When a wireless resource with which at least part of the generated UL data can be transmitted is already allocated, as a result, the MS 5 uses the allocated wireless resource to transmit the data to the BS 1 (from Y route at step B24 to step B26). When a wireless resource for the remaining data is not allocated on this occasion, it is preferable that the MS 5 secure a UL bandwidth for transmission of a BR header or the like and transmit the BR header or the like.

On the other hand, when a wireless resource that is not sufficient to transmit the UL data but is sufficient to transmit the BR header is already allocated, the MS 5 transmits the BR header to the BS 1 to request allocation of a wireless resource (from N route at step B24 and Y route at step B25 to step B27).

When a wireless resource necessary to transmit the BR header is not allocated, the MS 5 makes the code generator 55 generate a BR code corresponding to the QoS size and the requested size on the basis of the QoS class and the code index data for each requested size in the memory 62, and transmits the BR code to the BS 1 (from N routes at steps B24 and B25 to step B28).

As illustrated in FIG. 11, for example, it is assumed here that, among three MSs (#1, #2 and #3) 5-1, 5-2 and 5-3, the MS 5-1 is in a high QoS class, the MS 5-2 is in a middle QoS class lower than the high QoS class and the MS 5-3 is in a low QoS class lower than the middle QoS class, and the MSs 5-1, 5-2 and 5-3 execute the above step B28 at a certain time to generate BR codes and transmit the BR codes to the BS 1 in order that the MSs 5-1, 5-2 and 5-3 make request for UL bandwidths of 60 bytes, six bytes and six bytes for their connections, respectively (steps S31 to S33). Note that the order of the transmission at that time is ignorable.

The BS 1 having received the BR codes from the MSs 5-1, 5-2 and 5-3 (Y route at step A21 in FIG. 12) makes the code analyzer 25 analyze the BR codes to identify QoS classes and requested sizes, and gives this information to the controller 27.

The controller 27 rearranges the received BR codes in the descending order of rank of the QoS class on the basis of the information given from the code analyzer 25 (step A22), gives preference to a BR code having the high QoS class on the basis of the code index data for each requested size in the memory 26, and specifies a data size corresponding to this BR code.

The controller 27 confirms state (available wireless resource) of use (allocation) of the wireless resource on the basis of the data stored in the memory 26, determines a wireless resource (UL bandwidth) with which the data size can be transmitted according to the state, generates a UL-MAP message containing the allocation information, and transmits the UL-MAP message (step A23).

In the example in FIG. 11, the controller 27 allocates UL bandwidths, with which the MS 5-1 of the high QoS class and the MS 5-2 of the middle QoS class can transmit data (60 bytes from MS 5-1 and six bytes from MS 5-2) in requested sizes, to the MS 5-1 and MS 5-2, with the use of "CDMA_Allocation-IE" in UL-MAP messages, respectively (step S34). The controller 27 puts off allocation of an UL bandwidth with which the MS 5-3 of low QoS class can transmit data of six bytes.

In this example, preference may be given to the MS 5-1 in high QoS class over the other MSs, and allocation of a UL bandwidth to the MS 5-2 in middle QoS class may be put off. Alternatively, when the available wireless resource is consumed or runs short because an UL bandwidth is allocated to the MS 5-1 in high QoS class, allocation of an UL bandwidth to the MS 5-2 lower in QoS class than the MS 5-1 may be put off.

When the available bandwidth runs short, bandwidth allocation with only available wireless resource at that time is possible. Further, when plural MSs 5 (connections) in the same QoS class are present, the bandwidth allocation may be done to any connection. For example, the bandwidth allocation may be done in the order in which the BR codes were received, or in the order of their increasing (or decreasing) requested sizes.

The BS 1 (controller 27) could not specify which MS 5-1, 5-2 or 5-3, has transmitted the BR code and which burst profile is available, if receiving only the BR code.

In this embodiment, it is preferable that the BS 1 (controller 27) put information (code index, reception frame number of code, sub channel number, symbol number, etc.) relating to the received BR code in a UL-MAP message (CDMA_Allocation-IE). Whereby, each of the MSs 5 (5-1, 5-2) can discriminate whether a received UL-MAP message is addressed to its own station or not. As to burst profile, one that the MSs 5 support in common, preferably, one that has the best resistance to noise and propagation loss (for example, QPSK, coding rate ½) should be selected.

The MS 5-1 and 5-2 execute step B26 illustrated in FIG. 13 to transmit UL data (MAC-PDUs) in UL bandwidths allocated by the UL-MAP messages, respectively (S35 and S36 in FIG. 11). Namely, the MS 5-1 and 5-2 can transmit UL data even when not allocated UL bandwidths for transmitting BR headers from the BS 1.

After completion of transmission of UL data from the MSs 5-1 and 5-2, the BS 1 performs bandwidth allocation to a connection of the MS 5-3 in low QoS class in the same manner as the MSs 5-1 and 5-2 (step S37).

The MS 5-3 executes step B26 illustrated in FIG. 13 to transmit UL data (MAC-PDU) in an UL bandwidth allocated by the UL-MAP message without transmitting a BR header to the BS 1 (step S38).

In the example in FIG. 11, the BS 1 (controller 27) starts the bandwidth allocation process to a connection in lower QoS class after completion of transmission of UL data from the MS 5-1 (5-2) to which the BS 1 has allocated the UL bandwidth. However, the BS 1 may start the bandwidth allocation process to a connection (MS 5-3) in lower QoS class at an early timing, not waiting completion of the transmission, in consideration of a delay time (time-out time in retransmission at TCP, etc. described above).

As stated above, in this embodiment, since the BS 1 can identify a QoS class and a transmission data amount corresponding to a BR code when successfully receiving the BR code from the MS 5, the BS 1 can give preference to an MS 5 in high QoS class to execute UL bandwidth allocation for UL data transmission according to the transmission data.

Accordingly, this embodiment can provide the same effects and advantages as the above mentioned embodiments. Further, according to this embodiment, since the BS 1 does not need to allocate a UL bandwidth with which the MS 5 transmits a BR header and the MS 5 does not need to transmit the BR header, it is possible to further shorten the time required from when the MS 5 transmits a BR code to when the BS 1 allocates a necessary UL bandwidth to the MS 5, and to efficiently use the UL bandwidth.

[4] Fourth Embodiment

In the above embodiments, there is used a BR code representing association of the BR code with QoS class and/or data size (requested size). However, further meaning can be given to BR code. For example, information (MS-ID) for identifying the MS 5 or information (CID) for identifying a logical connection between the BS 1 and the MS 5 can be associated with BR code.

Table 6 illustrates an example of BR code corresponding to QoS class, requested size and MS-ID.

TABLE 6

Example of BR code corresponding to QoS class, requested (data) size and MS-ID

| Code Index | Corresponding QoS | Requested size (bytes) | MS-ID |
|---|---|---|---|
| X1 | low | 6 | $MS_X$ |
| X2 | low | 60 | $MS_X$ |
| X3 | middle | 6 | $MS_X$ |
| X4 | middle | 60 | $MS_X$ |
| X5 | high | 6 | $MS_X$ |
| X6 | high | 60 | $MS_X$ |
| Y1 | low | 6 | $MS_Y$ |
| Y2 | low | 60 | $MS_Y$ |
| Y3 | middle | 6 | $MS_Y$ |
| Y4 | middle | 60 | $MS_Y$ |
| Y5 | high | 6 | $MS_Y$ |
| Y6 | high | 60 | $MS_Y$ |
| . | . | . | . |
| . | . | . | . |
| . | . | . | . |

In this embodiment, BR codes associated with respective QoS classes may be of the same number, or part or all of the BR codes may be of different numbers. Like the first embodiment, the number of codes for high QoS class may be set to be larger than that of codes for lower QoS classes to decrease probability of collision of the codes.

The example in Table 6 illustrates only a case where the requested size is only two kinds, that is, six bytes and 60 bytes. However, a different BR codes may be set for a different requested size, of course.

In this embodiment, data (QoS class, requested size and code index data for each MS) defined as illustrated in Table 6 is stored and managed in the memory 26 of the BS 1. On the other hand, the MS 5 needs only to store and manage code index data relating to its own station in the memory 63 among data illustrated in Table 6.

The partial code index data can be contained in the ranging response (RNG-RSP) message described above, which is a DL message to individual MS 5, and notified individually from the BS 1 to the MS 5. When the BR code is a code associated with a CID, the code index data is contained in a DL message to individual connection such as dynamic service addition request/response (DSA/REQ/RSP) message or the like, whereby the code index data for each connection can be notified from BS 1 to MS 5. In the case where no problem will arise even if all contents of the above Table 6 containing the code index data for other MSs 5 than an MS 5 in question are notified to all the MSs 5, the BS 1 may use a broadcast message such as a UCD message or the like described hereinbefore to notify the contents to the MS 5.

When having data to be transmitted to the BS 1, the MS 5 (controller 62) makes the code generator 55 generate a BR code corresponding to a QoS class, a transmission data amount (requested size) and its own station (or connection) on the basis of the code index data in the memory 63, and transmits the BR code to the BS 1.

On the other hand, the BS 1 (controller 27) identifies a QoS class, a requested size and an MS (connection) on the basis of the code index data in the memory 26 when receiving the BR code from the MS 5, allocates a wireless resource (UL bandwidth) according to the QoS class and the requested size to the identified MS 5 in the similar manner to the third embodiment.

In this case, since the BS 1 (controller 27) can identify an MS that has transmitted the BR code so long as the BS 1 can successfully receive the BR code, the BS can specify the MS 5 that has transmitted the BR code in an early stage before receiving the BR header. Whereby, the BS 1 can early generate a UL-MAP message containing information (MS-ID) for identifying the MS 5, for example.

On such occasion, it is unnecessary that the UL-MAP message (CDMA_Allocation-IE) always contains information (code index, reception frame number of code, sub channel number, symbol number, etc.) relating to the received BR code. Therefore, the amount of information of UL-MAP message can be more decreased and the wireless resource in DL can be used more effectively than the other embodiments.

Further, the BS 1 can manage the state of a wireless channel between the BS 1 and a communicating MS 5 by specifying the MS 5, thus can specify a suitable burst profile. In this embodiment, as to burst profile, the BS 1 (controller 27) selects one that is suited to the specified MS5 and puts the selected burst profile in the UL-MAP message to notify of the same. The state of a wireless channel can be grasped by measuring a feedback signal from the MS 5 or a UL signal from the MS 5.

According to this embodiment, when successfully receiving a BR code, the BS 1 can identify an MS 5 (or connection) that has transmitted the BR code, a QoS class of transmission data of the MS 5 and a transmission data size (requested size). Accordingly, the BS 1 can allocate a UL bandwidth for transmitting data according to a data size requested by an MS 5 to the MS, giving preference to an MS in high QoS class (allocation of a UL bandwidth for transmitting a BR header from the MS 5 is unnecessary).

Therefore, this embodiment provides the same effects and advantages as the above described embodiments, and further provides advantages that an information amount of allocation information (UL-MAP) on a UL bandwidth transmitted from BS 1 to MS 5 can be decreased, and the UL bandwidth can be efficiently used.

Meanwhile, in the technique described in Patent Document 1, the BS cannot determine from the received code which QoS, MS or connection the bandwidth allocation request is made for.

[5] Fifth Embodiment

In Table 6 above, BR code is defined for each MS 5. Otherwise, BR code can be defined for each burst profile.

Table 7 below illustrates an example of BR code corresponding to QoS class, data size and burst profile.

TABLE 7

Example of BR code corresponding to QoS class, requested (data) size and burst profile

| Code Index | Corresponding QoS | Requested size (bytes) | Burst Profile |
|---|---|---|---|
| X1 | low | 6 | QPSK ½ |
| X2 | low | 60 | QPSK ½ |
| X3 | middle | 6 | QPSK ½ |
| X4 | middle | 60 | QPSK ½ |
| X5 | high | 6 | QPSK ½ |
| X6 | high | 60 | QPSK ½ |
| Y1 | low | 6 | 16QAM ½ |
| Y2 | low | 60 | 16QAM ½ |
| Y3 | middle | 6 | 16QAM ½ |
| Y4 | middle | 60 | 16QAM ½ |
| Y5 | high | 6 | 16QAM ½ |
| Y6 | high | 60 | 16QAM ½ |
| . | . | . | . |
| . | . | . | . |
| . | . | . | . |

In this embodiment, BR codes associated with respective QoS classes may be of the same number, or part or all of the BR codes may be of different numbers. Like the first embodiment, the number of codes for high QoS class may be set larger than the number of codes for lower QoS class to decrease probability of collision of the codes.

In the example in Table 7, the requested size is of two kinds, that is, 6 bytes and 60 bytes, the modulation scheme is of two kinds, that is, QPSK and 16QAM, and the coding rate is ½. However, a different BR code may be defined for each of different requested sizes, each of three or more modulation schemes and each of two or more different coding schemes.

In this embodiment, data (QoS class, requested size and code index data for each burst profile) defined as illustrated in Table 7 above is stored and managed in the memory 26 of the BS 1 and the memory 63 of the MS 5, for example, to be shared by the BS 1 and the MS 5.

The code index data may be contained in a broadcast message such as UCD message or the like, a ranging response (RNG-RSP) message, or a DL message for individual MS 5 or connection such as a dynamic service addition request/response (DSA-REQ/RSP) message or the like, and notified from the BS to the MS 5.

When having data to be transmitted to the BS 1, the MS 5 (controller 62) makes the code generator 55 generate a BR code corresponding to a QoS class, a transmission data amount (requested size) and a burst profile to be used on the basis of the code index data in the memory 62, and transmits the BR code to the BS 1.

On the other hand, when receiving the BR code from the MS 5, the BS 1 (controller 27) specifies a corresponding QoS class, requested size and burst profile on the basis of the code index data in the memory 26, and allocates a wireless resource (UL bandwidth) according to the QoS class, requested size and burst profile.

In this case, the BS 1 (controller 27) cannot specify an MS that has transmitted the BR code but can specify a burst profile so long as the BS 1 has successfully received the BR code.

Accordingly, the UL-MAP message (CDMA_allocation-IE) contains information (code index, reception frame number of code, subchannel number, symbol number, etc.) relating to a received BR code. With respect to burst profile, a UL-MAP message contains a burst profile.

Whereby, the MS 5 encodes and modulates UL data in a burst profile notified to the BS 1 in the BR code when transmitting the UL data to the BS 1 in a bandwidth allocated by the BS 1.

Therefore, it is possible to avoid a phenomenon that the MS 5 communicable in more efficient burst profile (for example, communicable in 64 QAM at coding rate of ½) communicates in a less efficient burst profile (for example, in QPSK at coding rate of ½), which prevents efficient use of the wireless resource. This is more effective when a wireless resource (UL bandwidth) is allocated for UL data having a large data size.

It is found from the above-described embodiments that as information that can be associated with BR code, there is information relating to QoS class, transmission data size, connection, burst profile (modulation scheme coding rate of MS 5), for example. In the above embodiments, all the combinations of these kinds of information are not described, but definition of BR code formed by a combination of the information not explicitly illustrated in the above embodiments is possible, of course.

[6] Sixth Embodiment

As stated above, when a BR code is not associated with an MS-ID (or CID), the BS 1 cannot specify an MS 5 that has transmitted the BR code. For this, the BS 1 generates and transmits allocation information directing the MS 5 to use not a burst profile according to a channel state between the BS 1 and the MS 5 but a burst profile having the best resistance to noise and propagation loss, for example. This allocation information contains information relating to the BR code, and the MS 5 can recognize on the basis of this information that the information is wireless resource allocation information addressed to its own station.

On the other hand, when BR code is such defined as to represent part or all of combinations of QoS class of MS 5, transmission data size of MS 5, information for identifying MS (connection) and burst profile, the number of necessary BR codes becomes enormous.

According to this embodiment, the MS 5 transmits two codes, that is, a BR code representing a bandwidth allocation request, a QoS class of the MS 5 and a transmission data size of the MS 5, and a code representing a bandwidth allocation request and the MS 5 (or connection), to the BS 1 at different timings (or in different subchannels). Therefore, this embodiment illustrates a manner that can provide a merit that the number of necessary BR codes is decreased and the reliability of the bandwidth allocation process at the time of BR code error is improved.

Figure 14:
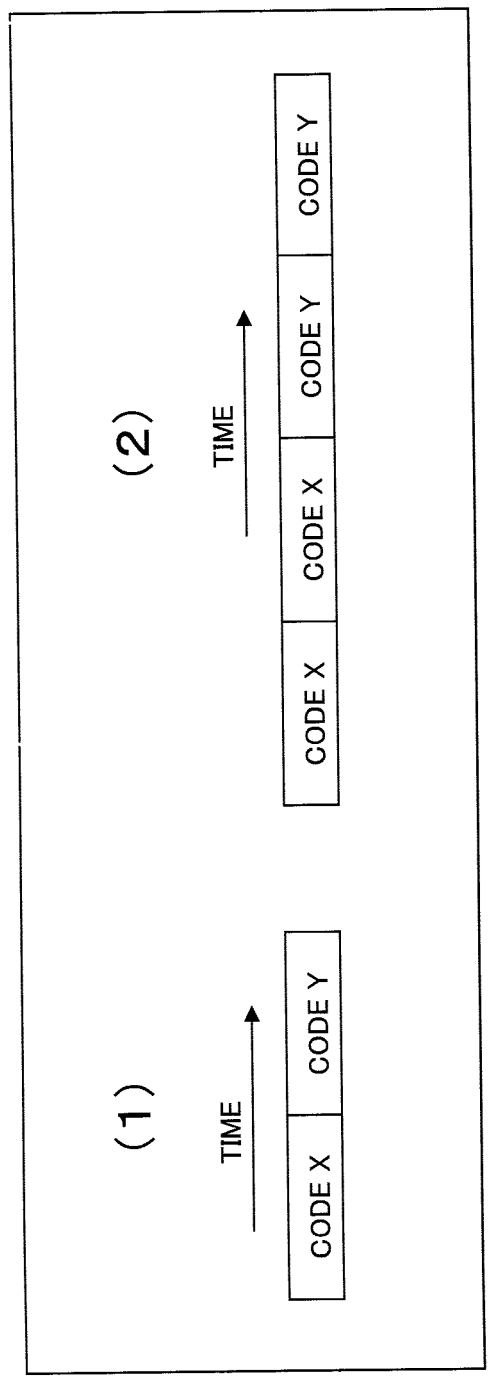
FIG. 14 Schematic diagram for illustrating an example of transmission of BR codes from the MS according to a fourth embodiment, in comparison with an example of normal transmission.

In general, CDMA code such as BR code is transmitted once as illustrated at (1) in FIG. 14, or the same code (X) is successively transmitted plural times as illustrated at (2) in FIG. 14. In the single transmission and plural transmissions of the codes in FIG. 14, there is no relationship between a code X and a code $Y_1$ each of which has an independent meaning. The code X and the code Y are generally transmitted from different MSs, but can be transmitted from the same MS.

Figure 15:
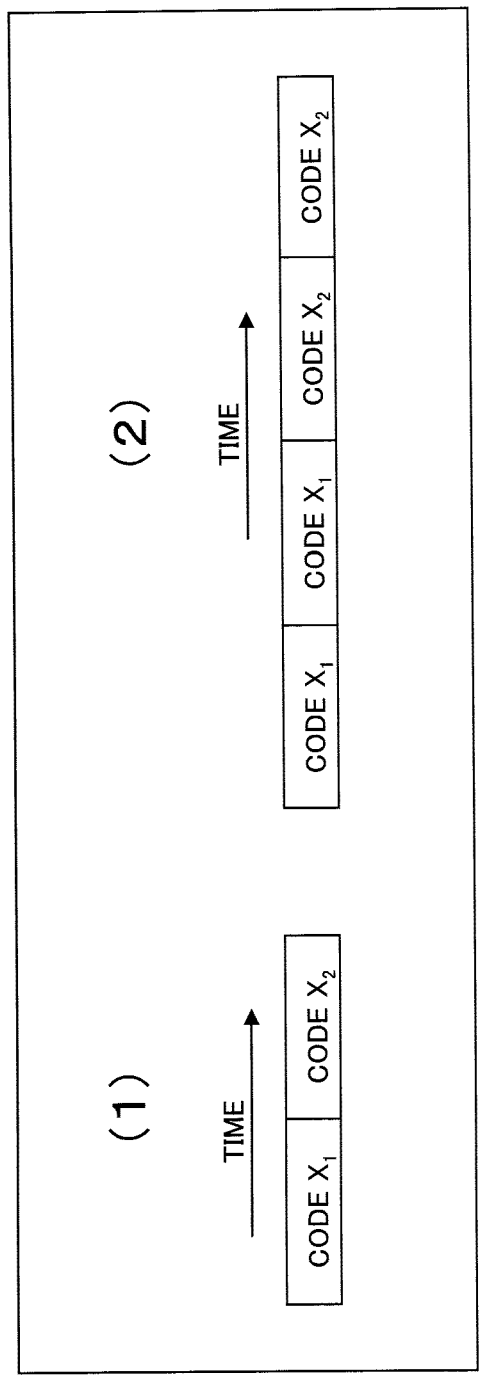
FIG. 15 Schematic diagram for illustrating an example of transmission of BR codes from the MS according to the fourth embodiment.

To the contrary, as illustrated at (1) and (2) in FIG. 15, this embodiment gives a relationship between a code $X_1$ and a code $Y_1$ in single transmission and plural transmission of the codes from the MS 5. Namely, these codes have different meanings, but a combination of these codes is defined as significant information. Note that the code $X_1$ and code $Y_1$ are transmitted from the same MS 5.

In FIG. 15, for example, the first code $X_1$ may be a code illustrated in the first embodiment or the third embodiment described above such as a code (first signal string) associated with a QoS class or a transmission data amount and representing meanings (first information) thereof, while the second code $Y_1$ may be a code (second signal string) associated with information (MS-ID) (or CID) for identifying the MS 5 and representing a meaning (second information differing from the first information) thereof.

Information (code index) of code $X_2$ representing MS-ID can be individually notified (allocated) to the MS 5 with use of a DL message transmitted from the BS 1 to the MS 5 in the course of the connection process from the MS 5 to the BS 1, for example. As the DL message, a ranging response (RNG-RSP) message can be used, for example.

The code $X_2$ may be a code representing an CID that is associated with information (CID) for identifying a logical connection between the BS 1 and the MS 5, or may be a code representing a burst profile associated with information for identifying a burst profile, other than the above MS-ID.

When the code $X_2$ is a code representing a CID, a code index thereof can be individually notified to the MS 5 by putting the code index in a DSA-REQ/RSP message which is an individual DL message to the above-mentioned connection, for example.

When the code $X_2$ is a code representing a burst profile, the code $X_2$ can be notified to the MS 5 by putting a code index thereof in a broadcast message such as the above-mentioned UCD message or the like, for example.

By receiving a code index transmitted from the BS 1 as above, the MS 5 can store and manage two kinds of information represented by the code $X_1$ and code $X_2$, respectively, stored and managed in the memory 26 of the BS 1 and information represented by a combination of these kinds of information in the memory 63. Namely, equivalent information (code index data) with respect to the code $X_1$ and code $X_2$ are shared by the BS 1 and the MS 5.

It is desirable that the MS 5 transmit the code $X_1$ and code $X_2$ in a predetermined order (transmission timings) or in the order designated by the BS 1. When the BS 1 designates the order of transmission of the code $X_1$ and code $X_2$ to the MS 5, the UCD message can be used, for example.

Further, it is desirable that the MS 5 transmits the code $X_1$ and code $X_2$ in such predetermined transmission timings that the MS 5 transmits the code $X_1$ at an odd number symbol and the code $X_2$ at an even number symbol, or transmits the code $X_1$ and code $X_2$ at transmission timings designated by the BS 1. When the BS 1 directs the timings to the MS 5, the UCD message can be used, as well.

Any information can be freely associated with the code $X_1$ and code $X_2$. In contrast with the above example, the code $X_1$ to be first transmitted may be a code representing a MS-ID, CID, burst profile or the like, whereas the code $X_2$ to be transmitted next may be a code illustrated in the first embodiment or the third embodiment described above, for example. This manner can provide the same or similar working effects as those to be described hereinafter.

In the example illustrated in FIG. 15, the MS 5 transmits a plurality of codes at predetermined timings or at timings designated by the BS 1, successively with respect to time. Even when the MS transmits the plural codes in successive (neighboring) subchannels (frequencies) or predetermined subchannels or subchannels designated by the BS 1, the same or similar working effects as those described hereinafter can be provided.

Figure 16:
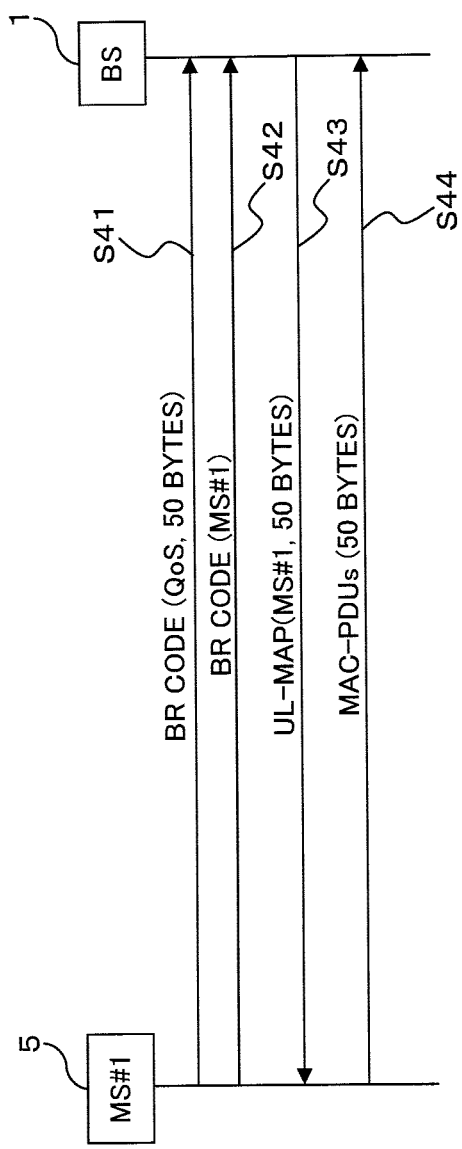
FIG. 16 Sequence diagram of a bandwidth allocation process between the BS and the MS in the wireless communication system according to the fourth embodiment.
Figure 17:
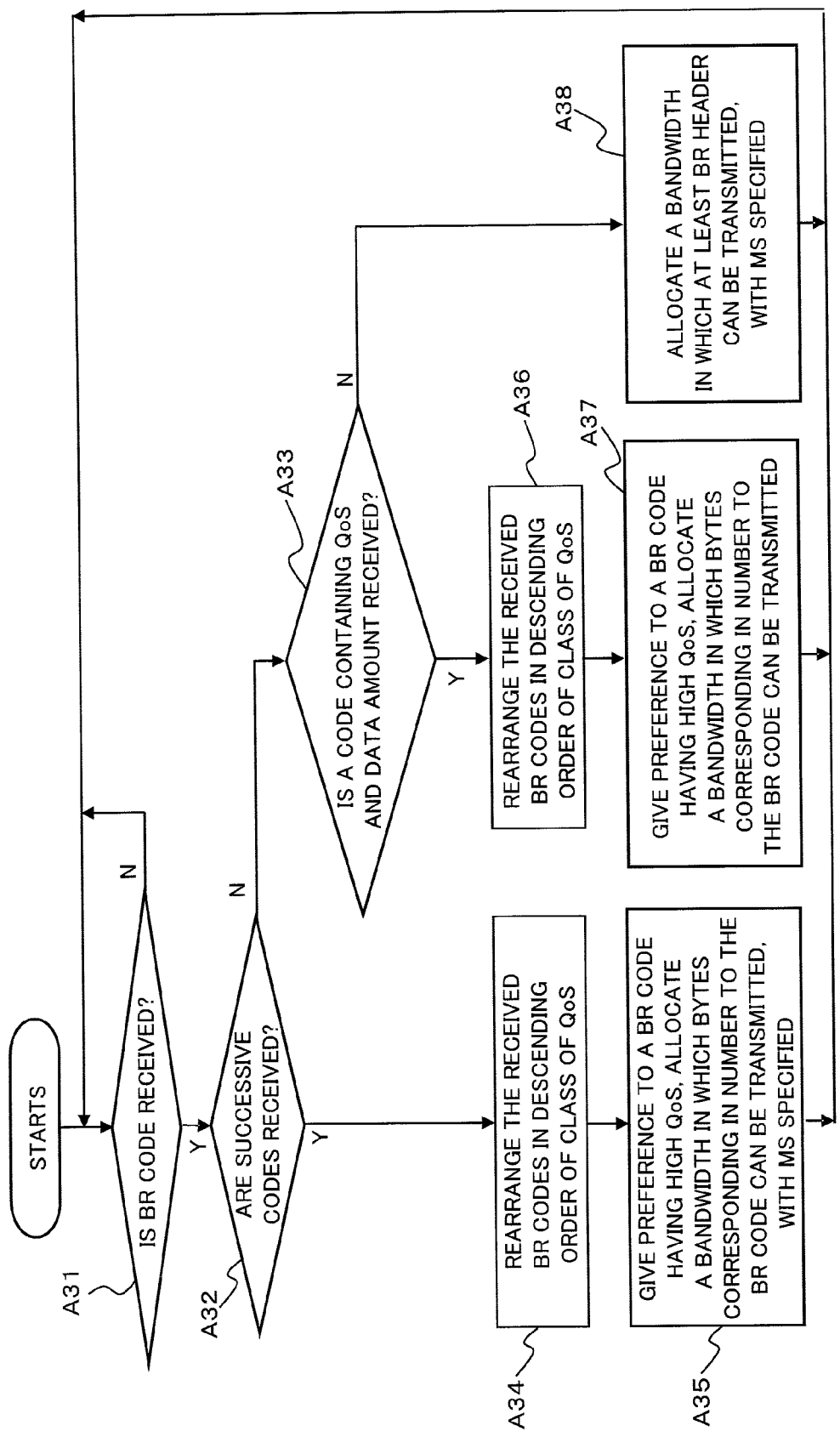
FIG. 17 Flowchart illustrating an operation of the BS when the BS receives BR codes according to the fourth embodiment.
Figure 18:
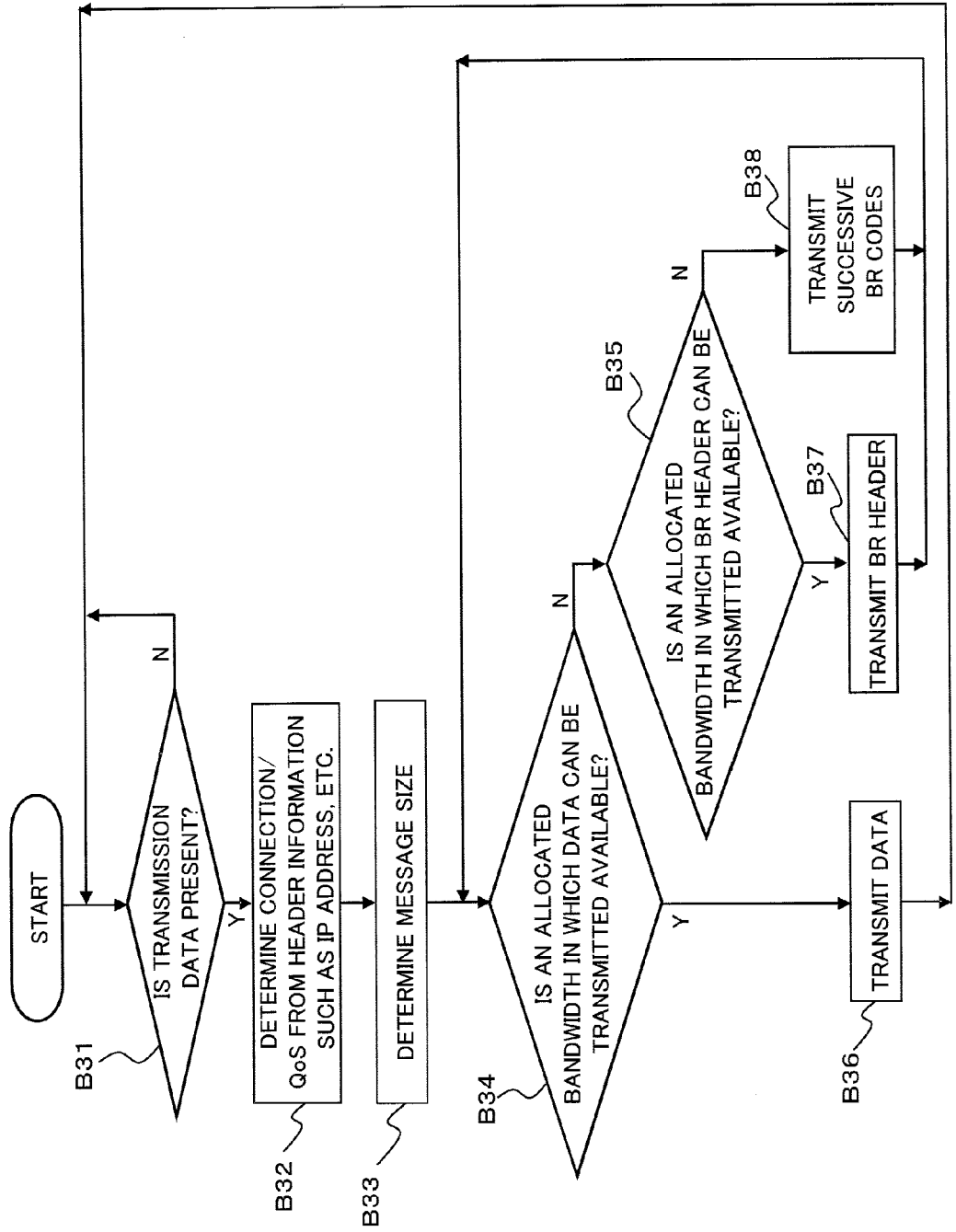
FIG. 18 Flowchart illustrating an operation of the MS when the MS makes a bandwidth request and performs a data transmission process to the BS according to the fourth embodiment.
Figure 19:
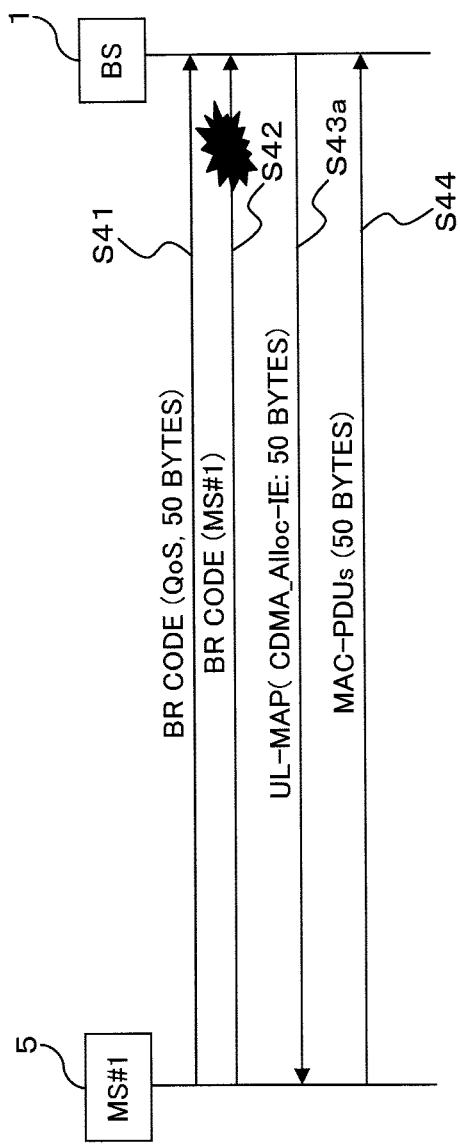
FIG. 19 Sequence diagram illustrating a bandwidth allocation process performed when the BS fails to normally receive either one of two codes successively transmitted from the MS in the wireless communication system according to the fourth embodiment.
Figure 20:
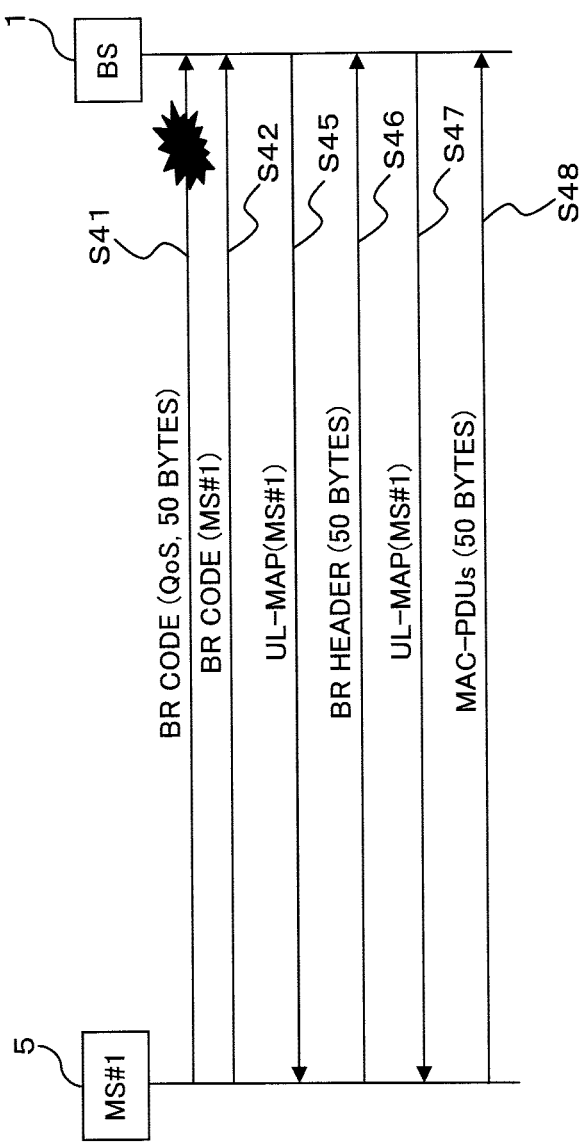
FIG. 20 Sequence diagram illustrating a bandwidth allocation process performed when the BS fails to normally receive either one of two codes successively transmitted from the MS in the wireless communication system according to the fourth embodiment.
Figure 21:
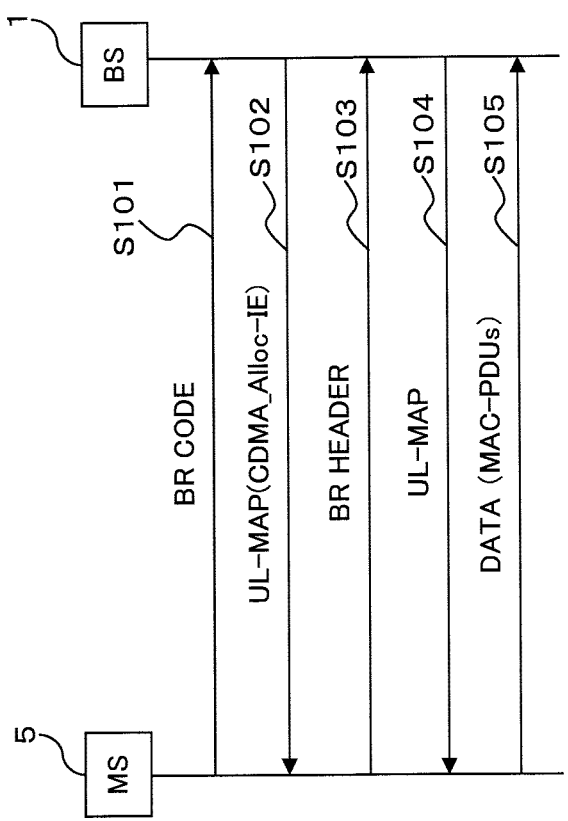
FIG. 21 Sequence diagram illustrating a known bandwidth allocation process between a BS and an MS.
Figure 22:
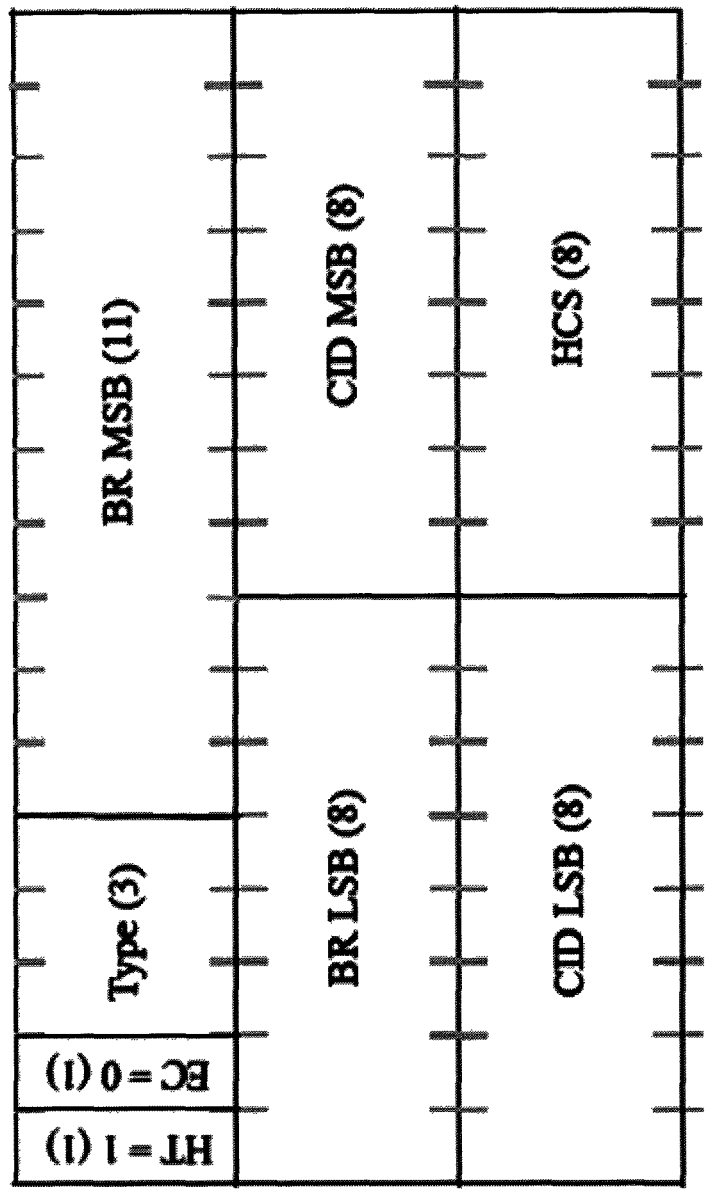
FIG. 22 Diagram illustrating a BR header format.

Hereinafter, an operation (bandwidth allocation process) according to this embodiment will be described with reference to FIGS. 16 to 20. FIG. 16 is a sequence diagram of the bandwidth allocation process between the BS 1 and the MS 5. FIG. 17 is a flowchart illustrating an operation of the BS 1 when the BS 1 receives a BR code from the MS 5. FIG. 18 is a flowchart illustrating a process of the MS 5 when the MS 5 makes a bandwidth request and performs a data transmission process to the MS 5. FIGS. 19 and 20 are sequence diagrams illustrating the bandwidth allocation process when the BS 1 fails to normally receive either one of two codes successively transmitted from the MS 5.

In the following description, it is assumed that the MS 5 transmits two codes successively with respect to time, and one (first code) of the two codes is a code representing a QoS class of the MS 5 and a transmission data size (requested size), while the other code (second code) is a code representing an MS-ID, for the sake of simplification. In this case, the first code represents contents corresponding to Table 5 illustrated above, and a combination of the first code and the second code representing an MS-ID can represent contents corresponding to Table 6 above.

As illustrated in FIG. 18, when data (UL data) to be transmitted to the BS 1 is generated (Y route at step B31), the MS 5 (controller 62) determines a connection (CID) between the BS 1 and the MS 5 and QoS information from header information such as an IP address or the like showing a destination of the transmission data (step B32), and calculates and determines a data size yielded when the transmission data is encapsulated in MAC-PDUs to be transferred on the wireless link (UL) between the MS 5 and the BS 1 (step B33).

The order of the processes at these steps B32 and B33 can be ignored, and the processes may be performed simultaneously. Like the above embodiments, presence and absence of UL data can be confirmed by monitoring whether data is stored in the PDU buffer 51 or not in this embodiment, for example.

The MS 5 (controller 62) confirms whether a wireless resource (UL bandwidth) with which the UL data can be transmitted is allocated by the BS 1 (step B34).

When a wireless resource with which at least part of the generated UL data can be transmitted is already allocated, as a result, the MS 5 uses the allocated wireless resource to transmit the data to the BS 1 (from Y route at step B34 to step B36). When a wireless resource for the remaining data is not allocated on this occasion, it is preferable that the MS 5 secure an UL bandwidth for transmitting a BR header or the like, and transmit the BR header or the like.

On the other hand, when a wireless resource that is not enough to transmit the UL data but is enough to transmit a BR header is already allocated, the MS 5 transmits the BR header to the BS 1 to make a request for allocation of a wireless resource (from N route at step B34 and Y route at step B35 to step B37).

When a wireless resource necessary to transmit an BR header is not allocated, the MS 5 (controller 62) makes the code generator 55 generate a BR code (first code) corresponding to a QoS class and a requested size and a BR code (second code) corresponding to an MS-ID on the basis of the code index data in the memory 62, and transmits the BR codes to the BS 1 successively with respect to time (from N routes at steps B34 and B35 to step B38). In the example in FIG. 16, the former BR code having a requested size of 50 bytes is first transmitted (steps S41 and S42).

FIG. 16 illustrates an example in which attention is given to one MS 5. However, when data to be transmitted to the BS 1 is generated in another MS 5 and a bandwidth sufficient to transmit a BR header is not allocated thereto, BR codes are successively transmitted in the similar manner to the above.

On the other hand, when receiving the BR codes from the MS 5 (Y route at step A31) as illustrated in FIG. 17, the BS 1 (controller 27) monitors whether the BR codes are successively received or not (step A32).

When the BS 1 has normally received both the BR codes successively transmitted from the MS 5 as above (Y route at step A32), the BS 1 rearranges the first code that the BS 1 has first received in descending order of rank of the QoS classes (step A34), and specifies a data size corresponding to this code, giving preference to a code in higher QoS class on the basis of the code index data in the memory 26.

The BS 1 identifies an MS 5 that has transmitted the BR codes on the basis of the second code that the BS 1 has secondary received. The BS 1 confirms a state (available wireless resource) of use (allocation) of the wireless resource on the basis of the data stored in the memory 26, determines a wireless resource (UL bandwidth) with which the MS 5 can transmit the data size according to the state, and generates and transmits a UL-MAP message containing allocation information thereon (step A35).

In the example in FIG. 16, the BS 1 allocates a UL bandwidth of an amount that the MS 5 can transmit data of a requested size (50 bytes) to the MS 5, with use of "CDMA_Allocation-IE" in the UL-MAP message (step S43).

Since the BS 1 has successfully received the second BR code in this case, the BS 1 can specify an MS that has transmitted this BR code, thereby to be able to generate a UL-MAP message containing information (MS-ID) for identifying this MS 5, for example.

It is not always necessary to put information (code index, reception frame number of code, subchannel number, symbol number, etc.) relating to the received BR code in the UL-MAP message (CDMA_Allocation-IE). Therefore, this case makes it possible to decrease the information amount of the UL-MAP message and effectively use the DL wireless resource, as compared with the case where this information is put in the message.

As to burst profile, the BS 1 can specify which burst profile is available by specifying the MS 5, like the fourth embodiment. Accordingly, the BS 1 can choose a burst profile that suits to the specified MS 5, and can put the chosen burst profile in the UL-MAP message to notify the burst profile to the MS 5.

When a UL bandwidth is allocated by the UL-MAP message, the MS 5 executes step B36 illustrated in FIG. 18 to transmit UL data (MAC-PDU) in an allocated UL bandwidth, without transmitting a BR header to the BS 1 (step S44 in FIG. 16).

As illustrated in FIGS. 19 and 20, there is possibility that the BS 1 fails to normally receive either one of the BR codes successively transmitted from the same MS 1 because of error of the code depending on the radio propagation environments. FIG. 19 illustrates a case where the BS 1 fails to normally receive the second code representing an MS-ID, whereas FIG. 20 illustrates a case where the BS 1 fails to normally receive the first code representing a QoS class and a requested size.

For example, when the BS 1 has normally received the first code representing a QoS class and a requested size but has failed to normally receive the second code representing an MS-ID as illustrated in FIG. 19, the BS 1 (controller 27) takes N route at step A32 and Y route at step A33 in FIG. 17 to rearrange the first code having been normally received in descending order of rank of the QoS classes (step A36), gives preference to a code in higher QoS class on the basis of the code index data in the memory 26, and specifies a data size corresponding to this code.

The BS 1 confirms a state (available wireless resource) of use (allocation) of the wireless resource on the basis of the data stored in the memory 26, determines, according to the state, a wireless resource (UL bandwidth) of an amount that the data size can be transmitted, and generates and transmits a UL-MAP message containing allocation information thereon (step A37).

In the example in FIG. 19, the BS 1 allocates a UL bandwidth with which the MS 5 can transmit data of a requested size (50 bytes) to the MS 5, with the use of "CDMA_Allocation-IE" in the UL-MAP message (step S43a).

In this case, since the BS 1 has failed to receive the second BR code, the BS 1 cannot specify an MS 5 that has transmitted this BR code. To cope with this, the BS 1 puts information (code index, reception frame number of code, subchannel number, symbol number, etc.) relating to the received BR code in the UL-MAP message (CDMA_Allocation-IE), for example, like the embodiments described hereinbefore. With respect to the burst profile, the BS 1 chooses one that MSs 5 support in common, preferably, one that has the best resistance to noise and propagation loss (for example, QPSK, coding rate of ½) and puts the chosen burst profile in the UL-MAP message.

To the contrary, when the BS 1 has failed to normally receive the first code representing the QoS class and requested size but has successfully received the second code representing the MS-ID as illustrated in FIG. 20, the BS 1 (controller 27) takes N route at step A32 and N route at step A33 in FIG. 17 to specify an MS 5 that has transmitted this code on the basis of the second code normally received, and allocates a wireless resource (UL bandwidth) of an amount with which the MS 5 can transmit at least a BR header (step A38).

In the example in FIG. 20, the BS 1 allocates a UL bandwidth of an amount with which the MS 5 can transmits at least a BR header to the MS 5, with use of "CDMA_Allocation-IE" in the UL-MAP message (step S45).

In this case, since the BS 1 (controller 27) has successfully received the second BR code, the BS 1 can specify an MS 5 that has transmitted this BR code, and can generate a UL-MAP message containing information (MS-ID) for identifying this MS 5, for example.

Therefore, it is not always necessary that information (code index, reception frame number of code, subchannel number, symbol number, etc.) relating to a received BR code is contained in the UL-MAP message (CDMA_Allocation-IE). Accordingly, this makes it possible to decrease the information amount of UL-MAP message and to use the DL wireless resource more effectively than a case where this kind of information is contained in the UL-MAP message.

With respect to the burst profile, the BS 1 can specify which burst profile the MS 5 can use, by specifying the MS 5. So, the BS 1 chooses one that suits to the specified MS 5, and puts the chosen burst profile in the UL-MAP message and notifies, like the fourth embodiment.

The MS 5 allocated thereto a UL bandwidth for BR header transmission from the BS 1 executes the step B37 in FIG. 18 to transmit the BR header to the BS 1 (step S46 in FIG. 20).

The BS 1 (controller 27) having received the BR header specifies an MS 5 having transmitted this BR header from a CID contained in the BR header, determines a wireless resource amount to be allocated to the MS 5 on the basis of a wireless resource amount necessary to transmit a data amount requested by the BR header and an available wireless resource amount, and allocates a bandwidth with the use of the UL-MAP message (step S47 in FIG. 20).

The MS 5 executes step B36 in FIG. 18 to transmit UL data (MAC-PDU) in a UL bandwidth allocated by the UL-MAP message (step S48 in FIG. 20).

According to this embodiment, the MS 5 successively transmits different BR codes having different meanings and having a relationship with each other to the BS 1, whereby a limited number of the BR codes can be effectively used. On the other hand, the BS 1 can detect information (QoS class, requested size, MS-ID, CID, burst profile, etc. of MS 5) represented by the successively received BR codes, thereby to determine and perform suitable allocation of the wireless resource according to the information, which allows efficient use of the wireless resource.

Even when part of the BR codes has failed to be normally received by the BS 1, the BS 1 can execute suitable wireless resource allocation according to information represented by the normally received BR code, which improves the reliability of the allocation process.

The techniques disclosed above can provide one or more effects or advances illustrated below, for example.

(1) The wireless base station can allocate a bandwidth to the wireless mobile station in consideration of service quality information on transmission data of the wireless mobile station.

(2) It is possible to shorten a delay time generating while the wireless base station allocates a wireless resource to the wireless mobile station.

(3) It is possible to efficiently use a wireless resource between the wireless base station and the wireless mobile station.

(4) The wireless base station can early specify (identify) a wireless mobile station that is requesting allocation of a wireless resource.

(5) Wireless resource allocation is made possible, in which the wireless mobile terminal can do transmission with the use of a suitable transmission method (modulation scheme and coding scheme).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for allocating a wireless resource in a wireless communication system having a wireless base station and wireless mobile stations, the method comprising:
    in each of the wireless mobile stations, transmitting a first signal string, representing a wireless resource allocation request and first information associated with service quality information on transmission data to be transmitted and a second signal string representing a wireless resource allocation request and second information differing from the first information to the wireless base station continuously with respect to time or in parallel at different frequencies; and
    in the wireless base station, when the first signal string and the second signal string are received continuously with respect to time or in parallel at the different frequencies from the each of the wireless mobile stations, identifying the first information represented by the respective first signal strings and the second information represented by the respective second signal strings, and controlling allocation of uplink wireless resource to the respective wireless mobile stations based on an available wireless resource amount and the identified first and second information, in order of preference determined according to the service quality information associated with the identified first information, preferentially on the wireless mobile station sending a higher service quality information than the other at least one wireless mobile station sending a lower service quality.

2. The method for allocating a wireless resource in a wireless communication system according to claim 1, wherein the wireless base station allocates an uplink wireless resource that each of the mobile stations can use to make a request to the wireless base station for an uplink wireless resource amount according to a transmission data amount of the transmission data to the respective wireless mobile stations in order of preference determined according to the service quality information associated with the identified first information.

3. The method for allocating a wireless resource in a wireless communication system according to claim 1, wherein the first information is further associated with a transmission data amount of the transmission data; and
    the wireless base station further identifies the first information with which the transmission data amount is associated based on the respective first signal strings received from the wireless mobile stations, and controlling the allocation of an uplink wireless resource according to the transmission data amount based on the service quality information associated with the identified first information and the transmission data amount associated with the identified first information.

4. The method for allocating a wireless resource in a wireless communication system according to claim 3, wherein the wireless base station allocates an uplink wireless resource according to the transmission data amount associated with the identified first information in order of preference determined according to the service quality information associated with the identified first information.

5. The method for allocating a wireless resource in a wireless communication system according to claim 1, wherein the second information is associated with information for identifying the wireless mobile station or information for identifying a connection of communication between the wireless base station and the wireless mobile station.

6. The method for allocating a wireless resource in a wireless communication system according to claim 1, wherein the second information is associated with information for identifying a modulation scheme and a coding scheme used in communication between the wireless base station and the wireless mobile station.

7. The method for allocating a wireless resource in a wireless communication system according to claim 1, wherein defined first signal strings representing the service quality information that the wireless mobile station can choose is increased in number as class of the service quality information is raised.

8. A method for allocating a wireless resource in a wireless communication system having a wireless base station and a wireless mobile station, the method comprising:
    in the wireless mobile station, transmitting a first signal string representing a wireless resource allocation request and first information and a second signal string representing a wireless resource allocation request and second information differing from the first information to the wireless base station continuously with respect to time or in parallel at different frequencies; and
    in the wireless base station, when the first signal string and the second signal string are received continuously with respect to time or in parallel at the different frequencies from the wireless mobile station, identifying the first information and the second information represented by the respective signal strings, and controlling allocation of a wireless resource to the wireless mobile station based on the identified information.

9. The method for allocating a wireless resource in a wireless communication system according to claim 8, wherein when the wireless base station fails to normally receive one of the first signal string and the second signal string, the wireless base station identifies information represented by the other signal string, and controls the allocation of a wireless resource based on the identified information.

10. The method for allocating a wireless resource in a wireless communication system according to claim 8, wherein either the first information or the second information is at least one of information for identifying the wireless mobile station, service quality information on transmission data to be transmitted from the wireless mobile station to the wireless base station, information relating to a transmission data amount of the transmission data, and information for identifying a modulation scheme and a coding scheme.

11. The method for allocating a wireless resource in a wireless communication system according to claim 8, wherein the different frequencies are designated by the wireless base station.

12. A wireless communication system having a plurality of wireless mobile stations and a wireless base station, each of the plurality of wireless mobile stations comprising:
a generator that generates a first signal string representing a wireless resource allocation request and first information associated with service quality information on transmission data to be transmitted and a second signal string representing a wireless resource allocation request and second information differing from the first information to the wireless base station; and
a transmitter that transmits the first signal string and the second signal string generated by the generator to the wireless base station continuously with respect to time or in parallel at different frequencies, wherein
the each of the wireless mobile stations undergoes allocation of uplink wireless resource by the wireless base station, based on an available wireless resource amount and the first and second information identified by the wireless base station based on the first signal string and the second signal string transmitted by the transmitter when the first signal string and the second signal string are received continuously with respect to time or in parallel at the different frequencies from the each of the wireless mobile stations, in order of preference determined according to the service quality information associated with the identified first information, preferentially on the wireless mobile station sending a higher service quality information than the other at least one wireless mobile station sending a lower service quality.

13. The wireless mobile station in a wireless communication system according to claim 12, wherein the first information represented by the first signal string is further associated with a transmission data amount of the transmission data.

14. A wireless base station in a wireless communication system having wireless mobile stations and the wireless base station, comprising:
a receiver that receives respective first signal strings representing a wireless resource allocation request and first information associated with service quality information on transmission data to be transmitted and second signal strings representing a wireless resource allocation request and second information differing from the first information transmitted continuously with respect to time or in parallel at different frequencies from the mobile stations;
an identifier that identifies the first information represented by the respective first signal strings and the second information represented by the respective second signal strings when the first signal strings and the second signal strings are received continuously with respect to time or in parallel at the different frequencies from the respective wireless mobile stations; and
a controller that controls allocation of an uplink wireless resource to the respective wireless mobile stations based on an available wireless resource amount and the first and second information identified by the identifier, in order of preference determined according to the service quality information associated with the identified first information, preferentially on the wireless mobile station sending a higher service quality information than the other at least one wireless mobile station sending a lower service quality.

15. The wireless base station in a wireless communication system according to claim 14, wherein the controller allocates an uplink wireless resource that each of the wireless mobile stations can use to make a request to the wireless base station for an uplink wireless resource amount according to a transmission data amount of the transmission data in order of preference determined according to the service quality information associated with the identified first information.

16. The wireless base station in a wireless communication system according to claim 14, wherein the first information represented by the received respective signal strings is further associated with a transmission data amount of the transmission data;
the identifier further identifies the first information with which the transmission data amount is associated based on the received first signal strings; and
the controller controls the allocation of an uplink wireless resource according to the transmission data amount based on the service quality information and the transmission data amount associated with the identified first information.

17. The wireless base station in a wireless communication system according to claim 16, wherein the controller allocates an uplink wireless resource according to the transmission data amount associated with the identified first information in order of preference determined according to the service quality information associated with the identified first information.

* * * * *